United States Patent
Demopoulos et al.

(10) Patent No.: US 6,964,015 B2
(45) Date of Patent: *Nov. 8, 2005

(54) REDLINE EXTENSIBLE MARKUP LANGUAGE (XML) SCHEMA

(75) Inventors: Steven J. Demopoulos, Corte Madera, CA (US); Richard J. Mascitti, San Rafael, CA (US); Robert W. H. Sinkler, San Francisco, CA (US)

(73) Assignee: Autodesk, Inc., San Rafael, CA (US)

(*) Notice: Subject to any disclaimer, the term of this patent is extended or adjusted under 35 U.S.C. 154(b) by 16 days.

This patent is subject to a terminal disclaimer.

(21) Appl. No.: 10/747,633

(22) Filed: Dec. 29, 2003

(65) Prior Publication Data

US 2004/0143792 A1 Jul. 22, 2004

Related U.S. Application Data

(63) Continuation of application No. 09/527,104, filed on Mar. 16, 2000, now Pat. No. 6,675,355.

(51) Int. Cl.[7] .............................................. G06F 17/00
(52) U.S. Cl. .................................... 715/513; 715/512
(58) Field of Search ................................. 715/513, 512, 715/523; 709/203, 246; 345/760

(56) References Cited

U.S. PATENT DOCUMENTS

| | | | | |
|---|---|---|---|---|
| 5,680,636 A | * | 10/1997 | Levine et al. ............... | 715/512 |
| 5,689,717 A | * | 11/1997 | Pritt ........................... | 715/512 |
| 5,893,126 A | * | 4/1999 | Drews et al. ............... | 715/512 |
| 6,081,829 A | * | 6/2000 | Sidana ........................ | 709/203 |
| 6,279,014 B1 | * | 8/2001 | Schilit et al. ............... | 715/512 |
| 6,405,199 B1 | * | 6/2002 | Carter et al. ................ | 707/6 |
| 6,476,828 B1 | * | 11/2002 | Burkett et al. .............. | 345/760 |
| 6,480,865 B1 | * | 11/2002 | Lee et al. .................... | 715/523 |
| 6,553,393 B1 | | 4/2003 | Eilbott et al. | |
| 6,571,295 B1 | * | 5/2003 | Sidana ........................ | 709/246 |
| 6,721,921 B1 | * | 4/2004 | Altman ....................... | 715/512 |
| 6,748,569 B1 | * | 6/2004 | Brooke et al. .............. | 715/523 |
| 6,806,890 B2 | * | 10/2004 | Audleman et al. .......... | 715/762 |

OTHER PUBLICATIONS

N. Walsh, XML.com—Understanding XML Schemas, Jul. 1, 1999, 29 pages.
Extensibility, XML Authority 1.1, © 1999, 6 pages.
Tech Encyclopedia, © 1981–1999, 2 pages.
R. Bourret, XML Schema Languages, Jun. 7, 1999, 42 pages.
R. Bourret, Feb. 11, 2000, 69 pages.
W3C, Extensible Markup Language (XML) 1.0, Feb. 10, 1998, 36 pages.
XML.com FAQ, © 1998, 3 pages.
Martin, Integration by parts: XSLT, XLink and SVG, Mar. 22, 2000, XML.com, pp. 1–5.

* cited by examiner

*Primary Examiner*—Sanjiv Shah
(74) *Attorney, Agent, or Firm*—Gates & Cooper LLP

(57) ABSTRACT

A method, data structure, and system provide the ability to display redline markups on a base document. A RedlineXML (extended markup language) document conforms to a RedlineXML schema. The RedlineXML schema identifies the structure of the RedlineXML document. The schema and document has a base document element that identifies a base document and an object element having one or more attributes for displaying a redline markup object on the base document. The redline markup object is then displayed on the base document in accordance with the objects element and the one or more attributes set forth in the RedlineXML document.

18 Claims, 11 Drawing Sheets

REDLINE EXTENSIBLE MARKUP LANGUAGE (XML) SCHEMA

CROSS-REFERENCE TO RELATED APPLICATIONS

This application is a continuation under 35 U.S.C. Section 120 of the following co-pending and commonly-assigned U.S. utility patent application, which is incorporated by reference herein:

Utility application Ser. No. 09/527,104, filed Mar. 16, 2000, by Steven J. Demopoulos, Richard J. Mascitti, and Robert W. H. Sinkler, entitled "REDLINE EXTENSIBLE MARKUP LANGUAGE (XML) SCHEMA", now U.S. Pat. No. 6,675,355, issued on Jan. 6, 2004.

This application is related to the following co-pending and commonly-assigned patent applications, all of which applications are incorporated by reference herein:

U.S. patent application Ser. No. 09/501,474, filed on Feb. 9, 2000, by Vincent Joseph Abeyta et. al., entitled "INTELLIGENT DRAWING REDLINING AND COMMENTING FEATURE", now U.S. Pat. No. 6,628,285, issued on Sep. 30, 2003;

U.S. patent application Ser. No. 09/488,308, filed on Jan. 20, 2000, by Lawrence Felser, et. al., entitled "SHAPE OBJECTS HAVING AUTHORABLE BEHAVIORS AND APPEARANCES", now U.S. Pat. No. 6,219,056 issued on Apr. 17, 2001;

U.S. patent application Ser. No. 09/088,116, filed on Jun. 1, 1998, by Lawrence Felser, et. al., entitled "POSITIONING AND ALIGNMENT AIDS FOR SHAPE OBJECTS WITH AUTHORABLE BEHAVIORS AND APPEARANCES", now U.S. Pat. No. 6,232,893, issued on May 15, 2001; and U.S. patent application Ser. No. 09/450,207, filed on Nov. 29, 1999, by Lawrence Felser, et. al., entitled "FRAMEWORK FOR OBJECTS HAVING AUTHORABLE BEHAVIORS AND APPEARANCES", now U.S. Pat. No. 6,462,751, issued on Oct. 8, 2002.

BACKGROUND OF THE INVENTION

1. Field of the Invention

The present invention relates generally to Extensible Markup Language (XML), and in particular, to a method, apparatus, and article of manufacture for using and processing redline or markup documents based on an XML schema.

2. Description of the Related Art

The internet is widely utilized to transmit and receive information in the form of web pages that are translated/interpreted and displayed by a web browser on a computer. Document definition languages are interpreted by a web browser and define how a document or information is to be displayed in the browser. Further, sets of rules, referred to as schemas, may provide for a particular structure of information. For example, an address schema may comprise constraints and limitations as to the order and sequence of elements and datatypes that define an address.

Computer graphics programs such as AutoCAD® permit users to redline or markup drawings. The redlines/markups may be stored in a file separate from the original drawing. Further, the redlines/markups may be transmitted across the internet and viewed/utilized by other users. However, the format and structure of redline/markup files may differ depending on the application utilized. Consequently, a consistent structure/schema that is utilized regardless of the application is desirable. The prior art does not provide for a redline or markup schema. These problems may be better understood by describing document definition languages and schemas.

So that a browser can interpret and display a web page, document definition languages and standard programming languages are utilized to define the web page. For example, hypertext markup language (HTML) is widely used to define web pages. However, HTML utilizes a predefined set of "tags" to describe elements on the web page. As a result, extensible markup language (XML) has become and is becoming more widely used on the internet. XML is more flexible than HTML and allows tags to be defined by the developer of the web page. Thus, tags for virtually any data items such as product, sales rep and amount due, can be used for specific applications, allowing web pages to function like database records.

XML provides a fairly complete set of tools for describing the parts of a document (elements), annotating those parts (attributes), and constraining the parts that can appear within the elements and attributes (content models and attribute types). Schemas use declarations to describe rules and constraints for elements and attributes, building a framework for documents out of a fairly small set of declarations. Declarations create a vocabulary and a set of constraints, identifying content and where it is to appear. Many schemas can be built using only a combination of element and attribute declarations, while other declarations (like entities and notations) can supplement these core declarations when needed in a particular situation.

Elements and attributes are the core structures of XML, the key features with which document content is built and annotated. Elements and attributes 'mark up' text into easily processed segments, labeled for identification. XML schemas describe the structure of those labels and identify (with varying degrees of precision) the material they may contain. Both elements and attributes may be used to contain simple data types, from basic text types to the sophisticated and complex data types proposed in XML-Data and other schema proposals. Only elements may contain structured content, storing elements within elements and defining potentially complex structure.

Elements and attributes have a number of key differences. Attributes cannot hold subcomponents—no child elements or attributes are allowed within an element. An application can still parse the content within an attribute value into smaller components, if it wants, but XML itself doesn't provide that facility. Attributes are always assigned to particular elements, while elements can appear inside of any other element as a child element if that element permits it. Attribute values can be set through default or fixed values set in the schema. Elements may have to contain certain other elements or text, but the actual value of that content cannot be fixed from the schema.

Attributes tend to be simpler, typically holding less (though often just as important) information that annotates an element. In general, elements annotate the content of a document, and attributes annotate elements. In practice, the limitations of attributes do restrict their use to some extent, although their ability to have defaults sometimes leads to their use in place of elements.

Schemas can constrain content for elements and attributes, requiring that the content within them meet certain criteria. In addition to identifying attribute types, attribute type declarations include a default declaration for each attribute. Default values allow schema developers to provide values for attributes, require that document authors provide values, or fix the value permanently. This makes it much easier to ensure that information appears when it should without requiring an enormous amount of extra markup within documents.

Thus, as described above, a schema is a model for describing the structure of information. An XML schema describes a model for a whole class of documents. The model describes the possible arrangement of tags and text in a valid document. A schema may also be viewed as an agreement on a common vocabulary for a particular application that involves exchanging documents. In schemas, models are described in terms of constraints. A constraint defines what can appear in any given context. As described, there are basically two kinds of constraints: content model constraints and datatype or attribute constraints. Content model constraints describe the order and sequence of elements and datatype or attribute constraints describe valid units of data.

For example, a schema might describe a valid <address> with the content model constraint that it consist of a <name> element, followed by one or more <street> elements, followed by exactly one <city>, <state>, and <zip> element. The content of a <zip> might have a further datatype or attribute constraint that it consist of either a sequence of exactly five digits or a sequence of five digits, followed by a hyphen, followed by a sequence of exactly four digits. No other text is a valid zip code. Once a schema is defined, documents may be interpreted or parsed in accordance with the schema. If the parsed document adheres to all of the specified constraints, the document is "valid". If the document does not adhere to all of the specified constraints, the document is invalid. The ability to test the validity of document is an important aspect of large web applications that are receiving and sending information to and from lots of sources. If a server is receiving XML transactions over the web, it is undesirable to process the content into a database if the information received is not in the proper format/schema.

Thus, although redline/markup documents are available in various applications and XML is becoming widely utilized, the prior art does not provide for a redline/markup schema.

SUMMARY OF THE INVENTION

A method, apparatus, and article of manufacture for processing RedlineXML documents. One or more embodiments of the invention provide a RedlineXML schema comprised of constraints for RedlineXML documents. The constraints provide restrictions as to the elements and attributes that may be utilized to define a RedlineXML document. The RedlineXML schema defines the Redline-Markup element as its 'root' node. The RedlineMarkup node is comprised of a BaseDocument element, a MarkupPlanes element, a Tags element, and an Objects element. The Objects element is comprised of any number of specific elements that may be utilized to redline or markup another document (referred to as the base document). For example, the Objects element may contain Box, Circle, Ellipse, Spline, Polyline, Group, Arc, Text, Cloud, Note, Callout, and/or Style elements. Each of the Objects elements may then be further constrained to specific attributes, datatypes, or values. The BaseDocument element specifies the name of the document that is being redlined or marked up (the base document), the system required to parse and display the specific base document type, and the name of the foreign element within the RedlineXML document that contains information about how to display the base document. For example, if the BaseDocument element specifies a drawing, URLs for the locations of the schema (for the drawing) and the drawing will be specified, as well as an identification of the system required to parse the elements defined by the schema.

To utilize the RedlineXML schema, a RedlineXML document that references the RedlineXML schema is obtained. A determination is made regarding whether the RedlineXML document complies with the constraints specified in the RedlineXML schema. If the document complies, the document is determined to be valid and is processed by a redline processor that is capable of reading the RedlineXML document and displaying the appropriate results. For example, the redline processor may comprise a graphics program that reads the RedlineXML document and displays the specified redline objects on the base document retrieved from the location specified in the RedlineXML document. If the RedlineXML document is invalid, the valid portions may be processed or the entire document may be rejected.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a RedlineXML schema that may be utilized to determine if RedlineXML documents are valid. The RedlineXML schema is comprised of a BaseDocument element, a MarkupPlanes element, a Tags element and an Objects element. All of these elements are optional. The BaseDocument element is used to specify the underlying document that is being redlined/marked up, the URL of that document, the system required to parse the foreign XML elements that define the specific base document type, and the name of the foreign XML element to search for that contains the data relevant for redlining/marking up the specific base document type. The MarkupPlanes element provides a collection of MarkupPlane elements that can be used to segregate the different redline objects created for the purpose of redlining or marking up the base document. The Tags element provides a collection of Tag elements that may be used to annotate the current state of the Tags element's parent element (in this case, the RedlineMarkup element), as well as keep a history of those annotations. The Objects element provides a collection of any number of certain types of RedlineXML elements that may be utilized to redline or markup a base document.

To utilize the RedlineXML schema, an XML document is compared to the schema to determine if the listed elements and attributes of the XML document comply with the constraints defined in the schema. If the XML document complies, it is deemed a valid RedlineXML document and it is processed and displayed in combination with the specified base document.

Hardware and Software Environment

Figure 1:
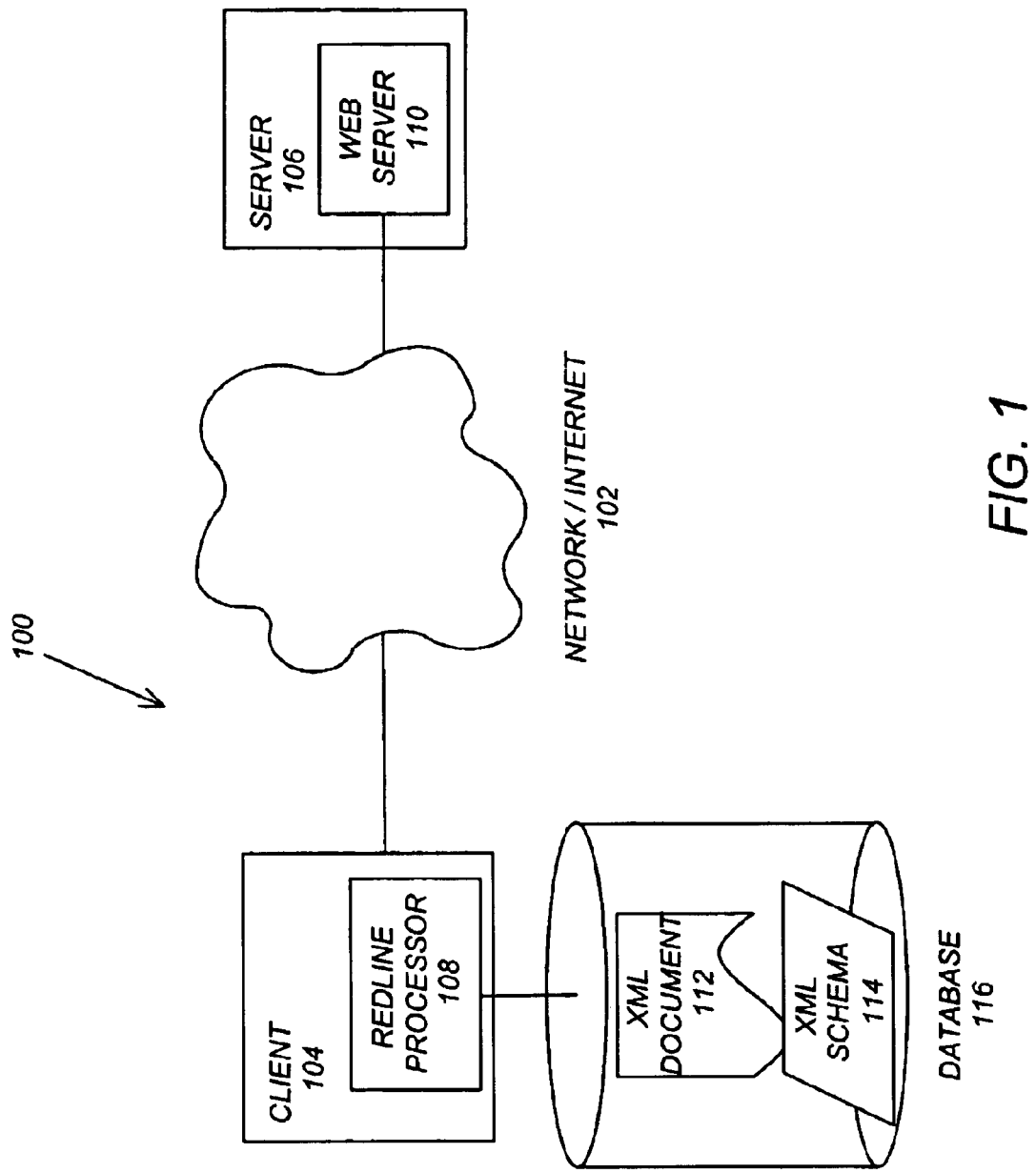
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or workstations, and servers 106 that are personal computers, workstations, minicomputers, or mainframes.

In accordance with one or more embodiments of the invention, the Internet 102 connects client computers 104 executing Web browsers to server computers 106 executing Web servers 110. The Web browser is typically a program such as Netscape's Navigator or Microsoft's Internet Explorer. Client computer 104 is configured with a redline processor 108 that is enabled to process and display redline objects programmed in XML. The redline processor 108 may be a stand alone application or a plug-in or ActiveX control for the Web browser. For example, redline processor 108 may be the VoloView™ application available from Autodesk, Inc., or the AutoCAD® application available from Autodesk, Inc. Redline processor 108 may interact with database 116 to obtain a RedlineXML document 112 and a RedlineXML schema 114. Once a RedlineXML document 112 is validated in accordance with RedlineXML schema 114, redline processor 108 processes the RedlineXML document 112. Such processing may include displaying redline information and objects on a computer monitor of client 104.

The Web server 110 is typically a program such as IBM's HyperText Transport Protocol (HTTP) Server or Microsoft's Internet Information Server. Generally, the components of the invention 104–116 all comprise logic and/or data that is embodied in or retrievable from device, medium, signal, or carrier, e.g., a data storage device, a data communications device, a remote computer or device coupled to the computer across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Embodiment Details

Embodiments of the invention provide an XML Schema definition for "redlining" or "markup". As described above, base documents may be redlined or marked up by users. For example, a base document may be marked up with box, circle, spline, polyline, group, arc, ellipse, text, cloud, callout, note, and/or style elements. Table 1 contains elements and attributes of a RedlineXML schema in accordance with embodiments of the invention. Table 2 contains a RedlineXML schema in XDR format (EXternal Data Representation (XDR) format —a data format dealing with integer size, byte ordering, data representation, etc. and is used as an interchange format) in accordance with one or more embodiments of the invention. The elements and attributes in Table 1 are further illustrated in the RedlineXML schema of Table 2. The invention provides a schema to be utilized to identify and define a redline/markup document in XML. The invention further provides a mechanism for displaying redline and markup objects utilizing the schema and RedlineXML document.

Other schema definitions may be utilized to define aspects of a RedlineXML document. For example, the AcadDWG XML schema definition of Table 4 and the AcadLT schema definition of Table 5 may be utilized as a basis for determining the validity of and parsing the elements from a foreign section of XML data found within a RedlineXML document. However, the AcadDWG XML schema is defined outside of the RedlineXML schema definition and may only be utilized as necessary to specify the format for elements found in a section of XML data specified by the BaseDocument element. These foreign elements are used to encapsulate information about different base document types. Further, additional schemas (such as the AcadLT XML schema) may be utilized to specify foreign elements that may be utilized in a RedlineXML document. The elements specified in such a schema can be utilized in a RedlineXML document after required RedlineXML elements and the document will still be considered valid.

Figure 2:
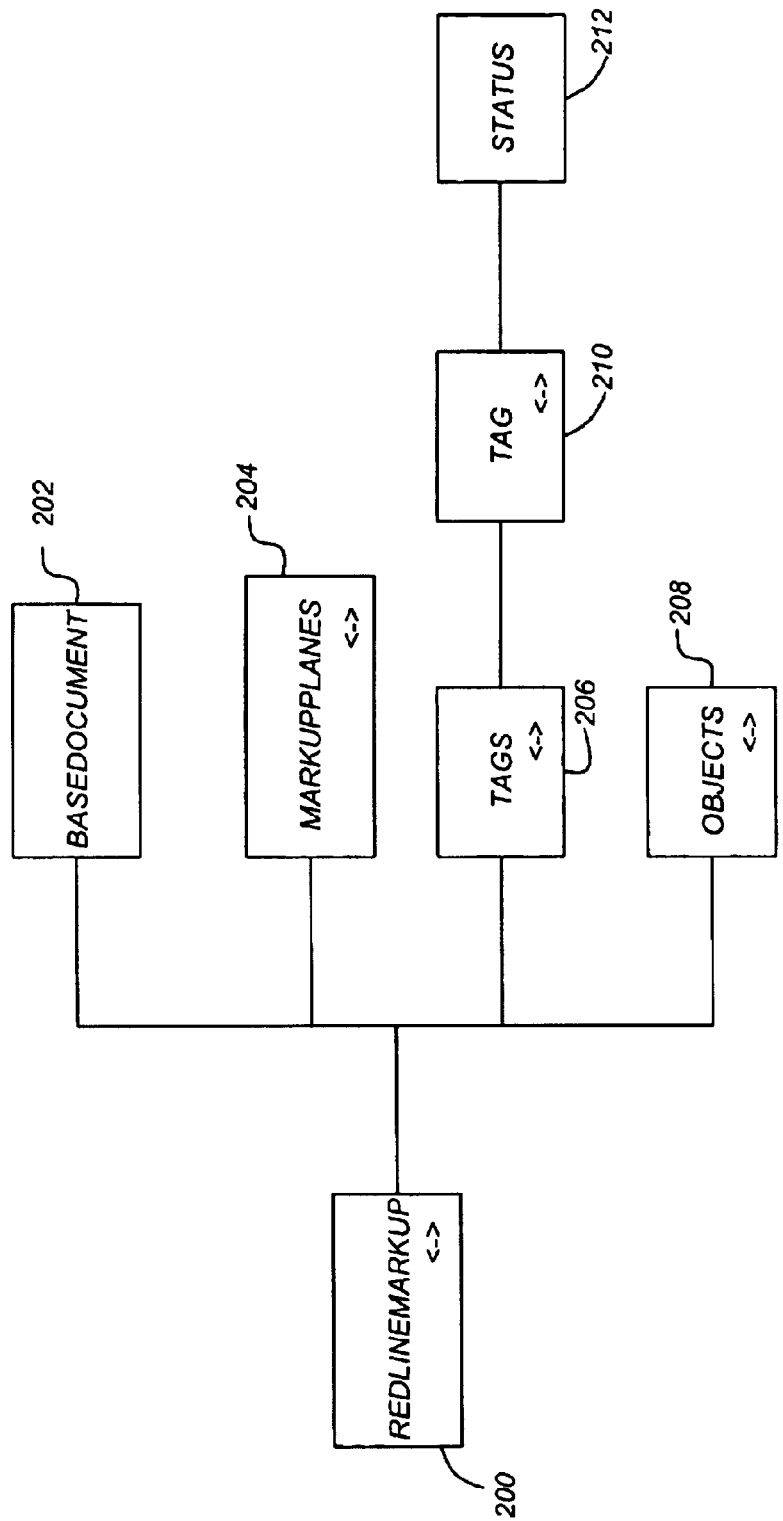
FIG. 2 illustrates a graphical overview of the RedlineXML schema.

FIG. 2 illustrates a graphical overview of the RedlineXML schema. In the FIG. 2 model, a RedlineMarkup element 200 is the toot, and contains BaseDocument 202, MarkupPlanes 204, Tags 206, and Objects 208 elements. Elements containing the notation "<–>" (e.g., Redline- Markup 200, MarkupPlanes 208, Tags 206, and Objects 208,) may be further expanded and contain children elements. Each of the elements 202–208 is optional.

The BaseDocument element 202 specifies the base document that is being marked up. The attributes of the BaseDocument element 206 provide the information needed to recognize and parse the elements of a foreign XML schema used to represent the type of base document being marked up. In the case of DWG/DXF files, an acad:Drawing element is defined in an AcadDWG schema and inserted after the RedlineMarkup element within a RedlineXML document. Elements defined outside of the RedlineXML schema are prefixed by the namespace identifier used to distinguish what schema the elements are defined in. In the case of DWG/DXF files, acad:is the namespace identifier.

Figure 3:
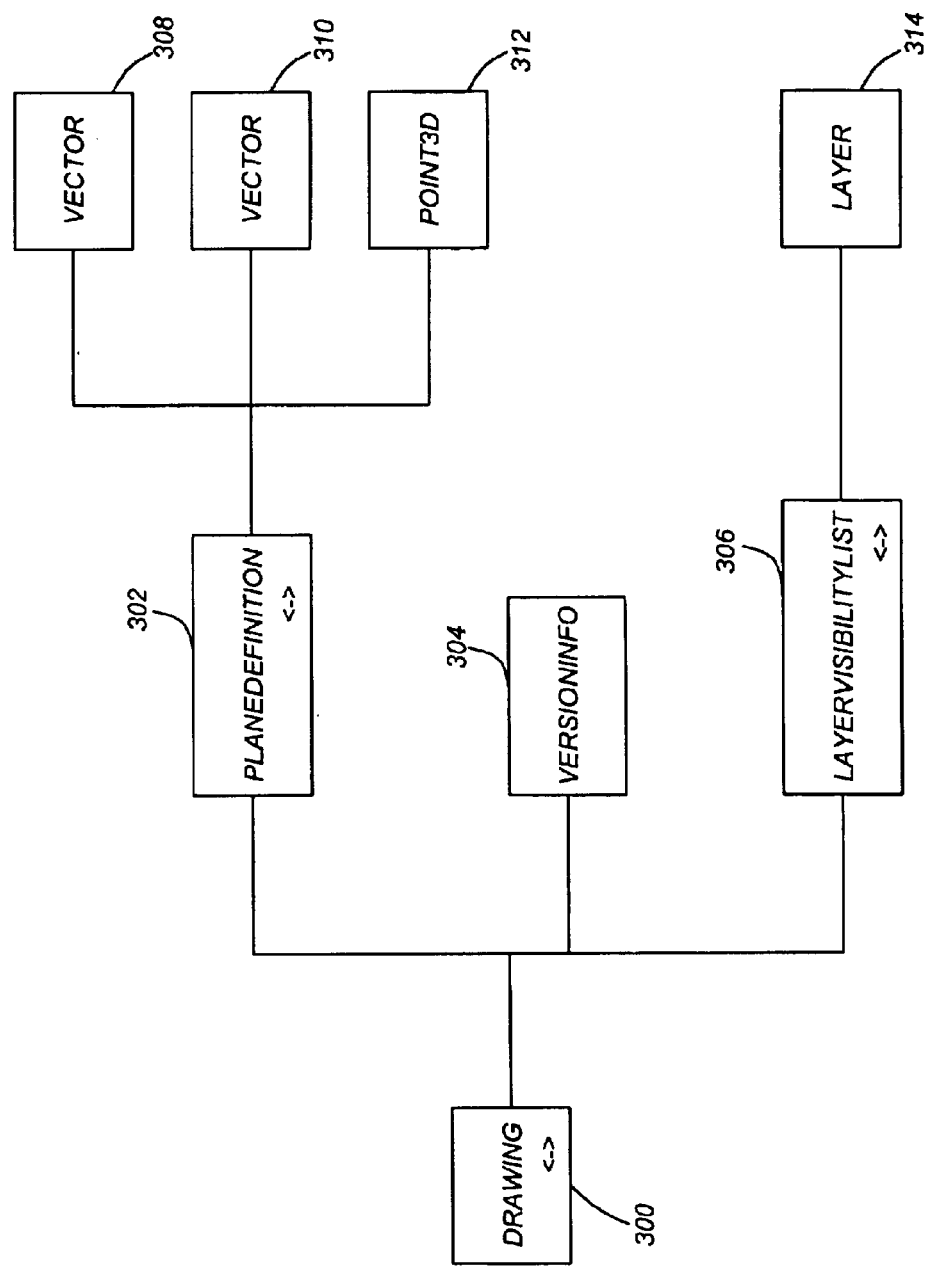
FIG. 3 illustrates a Drawing element provided in accordance with one or more embodiments of the invention.

FIG. 3 illustrates the acad:Drawing element 300. The acad:Drawing element 300 contains an attribute for the drawingName (a URL specification for the location of the drawing being marked up), and may contain an optional layoutName (for the name of the layout of the drawing that is being marked up) and an optional viewName (for the name of the view of the drawing that is being marked up). An acad:Drawing element 300 may contain one or more of the illustrated elements acad:PlaneDefinition 302, acad:VersionInfo 304, and acad:LayerVisibilityList 306. The acad::PlaneDefinition element 302 may be used to reproduce a 3D orthographic or perspective view within model space. The acad:PlaneDefinition element 302 is made up of an acad:Point3d element 312 (eye point), an acad:Vector element 310 (view direction vector), and optionally another acad:Vector element 308 (up vector) and attributes to define perspective viewing parameters. The acad:LayerVisibilityList element 306 is a collection of acad:Layer elements 314. The acad:Layer elements 314 each contain information about the state of a corresponding layer in the drawing specified by the acad:Drawing element 300.

Referring back to FIG. 2, the Tags element 206 contains information on the status of its parent element (in this case, the entire RedlineXML document). The Tags element 206 is a collection of Tag elements that may contain information about when the RedlineXML document was accessed and what users accessed it. The Tag element 210 also contains a Status element 212. The Status element 212 contains enumerated data that can have the following values: Pending, Approved, Incorporated, Rejected. The Tags element 206 is reused within each of the different objects that can be specified within the Objects element 208 (see details of the Objects element 208 below) (with the exception of the Style element) (see element 404 of FIG. 4), and contains information about the particular RedlineXML object.

Figure 4:
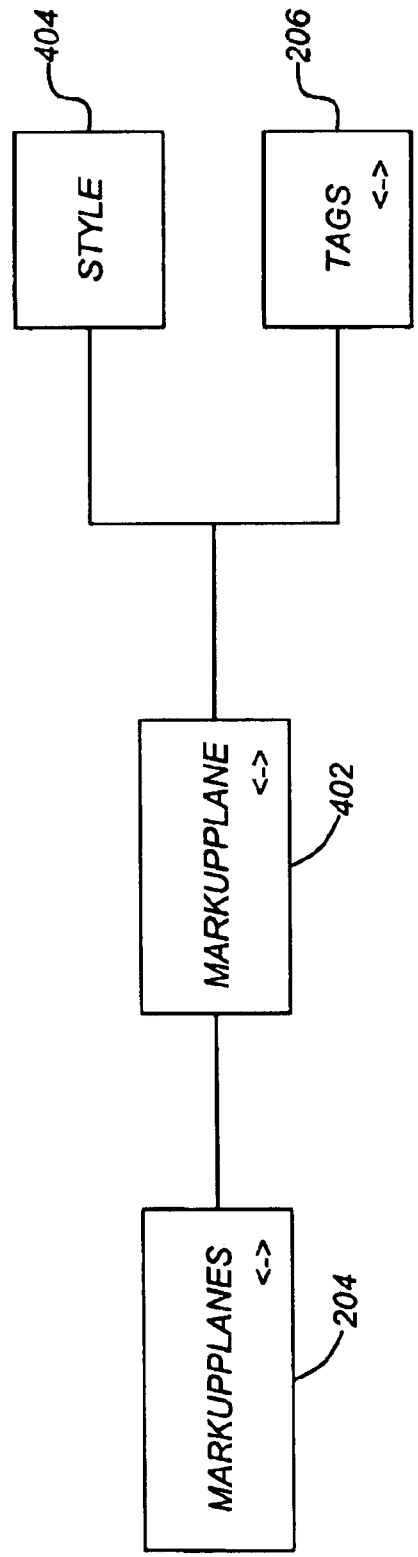
FIG. 4 illustrates a MarkupPlanes element provided in accordance with one or more embodiments of the invention.

FIG. 4 illustrates the MarkupPlanes element 204. The MarkupPlanes element 204 contains the MarkupPlane elements 402, 404, and 206 that represent the different markup planes defined in a redline processor application. Redline objects created in a redline processor application can be assigned to exactly one of multiple markup planes created by the application. Objects assigned to a markup plane may inherit their style attributes from the assigned markup plane, if the object does not specifically identify its own style attribute values. Markup planes can be used to collect different markup authors' redline objects. The Tags element 206 is also reused within the MarkupPlane element 402, and in this case, would contain information about the MarkupPlane and its contents.

Figure 5:
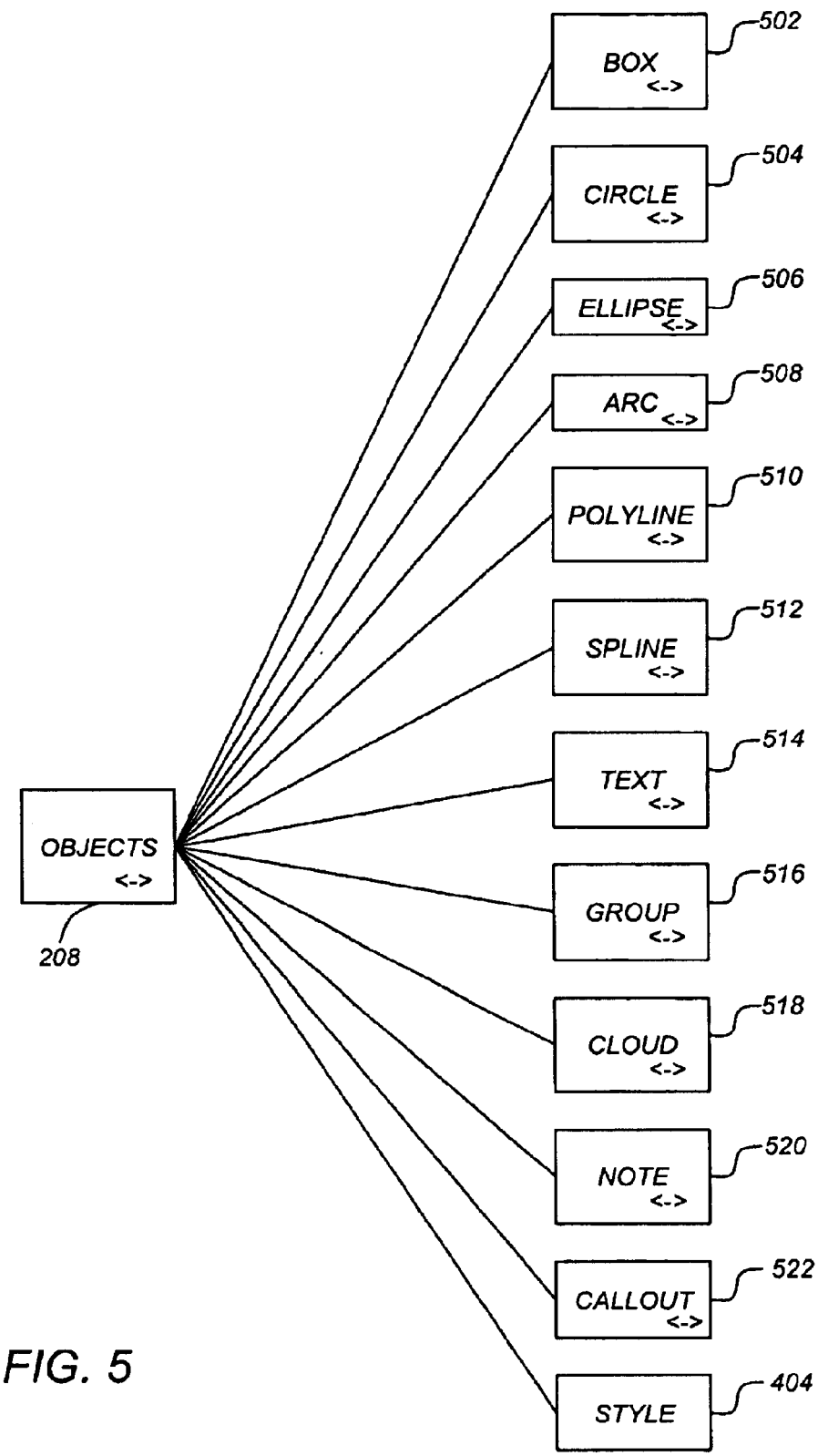
FIG. 5 illustrates an Objects element provided in accordance with one or more embodiments of the invention.

When a base document is redlined or marked up, the markups or redlines may be represented as objects. For example, to redline a base document with a circle or a box, a circle object or box object may be utilized. The redline objects themselves are contained by the Objects element 208. FIG. 5 illustrates the Objects element 208. The Objects element 208 contains the data that will represent the individual redline objects. The Objects element 208 contains an arbitrary number of redline objects: Box 502, Circle 504, Ellipse 506, Arc 508, Polyline 510, Spline 512, Text 514, Group 516, Cloud 518, Note 520, Callout 522, and Style 404. A fixed set of redline objects can be specified. Each redline object 502–522 and 404 may contain elements and attributes.

Figure 6:
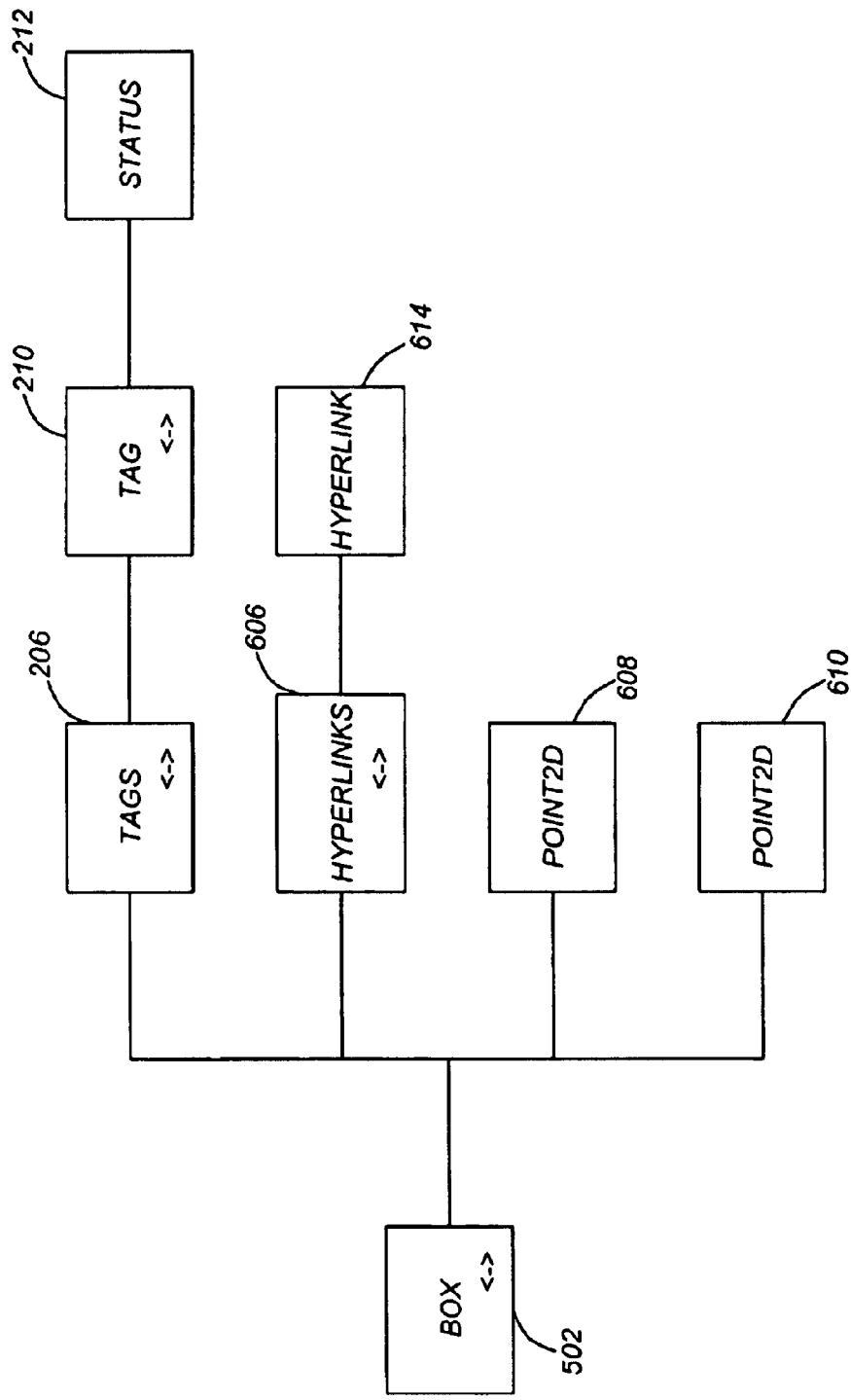
FIG. 6 illustrates a Box object element provided in accordance with one or more embodiments of the invention.

FIG. 6 illustrates the Box object element 502. A Box element 502 contains the Tags element 206 , a Hyperlinks element 606, and two Point2d elements 608 and 610. The Box element 502 also contains attributes to specify its cornerRadius, rotation, scale, and the name of the MarkupPlane element that corresponds to the markup plane to which the box object belongs. Similar to above, the Tags element 206 contains one or more Tag elements 210, each of which contains a Status element 212. The Hyperlinks element 606 contains one or more Hyperlink elements 614. The Point2d elements 608 and 610 specify two of the box object's diametrically opposed corners.

Figure 7:
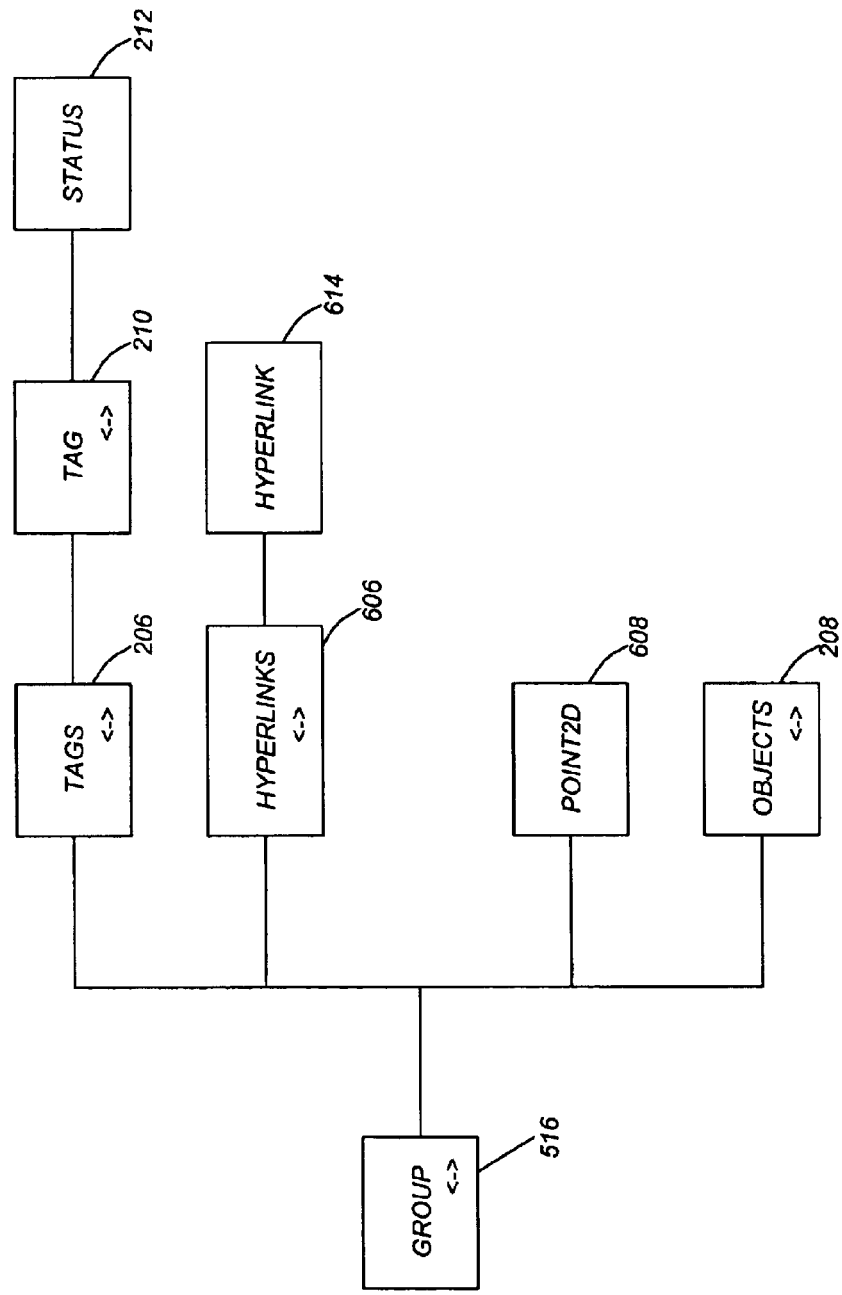
FIG. 7 illustrates a Group element provided in accordance with one or more embodiments of the invention.

Mote complex redline objects may be constructed using a Group element 516. A Group element 516 is simply a collection of other redline objects. FIG. 7 illustrates the Group element 516. A Group element 516 comprises the Tags element 206 (with one or more Tag elements 210 each containing a status element 212), a Hyperlinks element 606 (with one or more Hyperlink elements 614), a Point2d element 608 (that represents the insertion point of the Group object), and an Objects element 208 (that will contain other redline objects (as illustrated in FIG. 5) used to define the Group's appearance).

Figure 8:
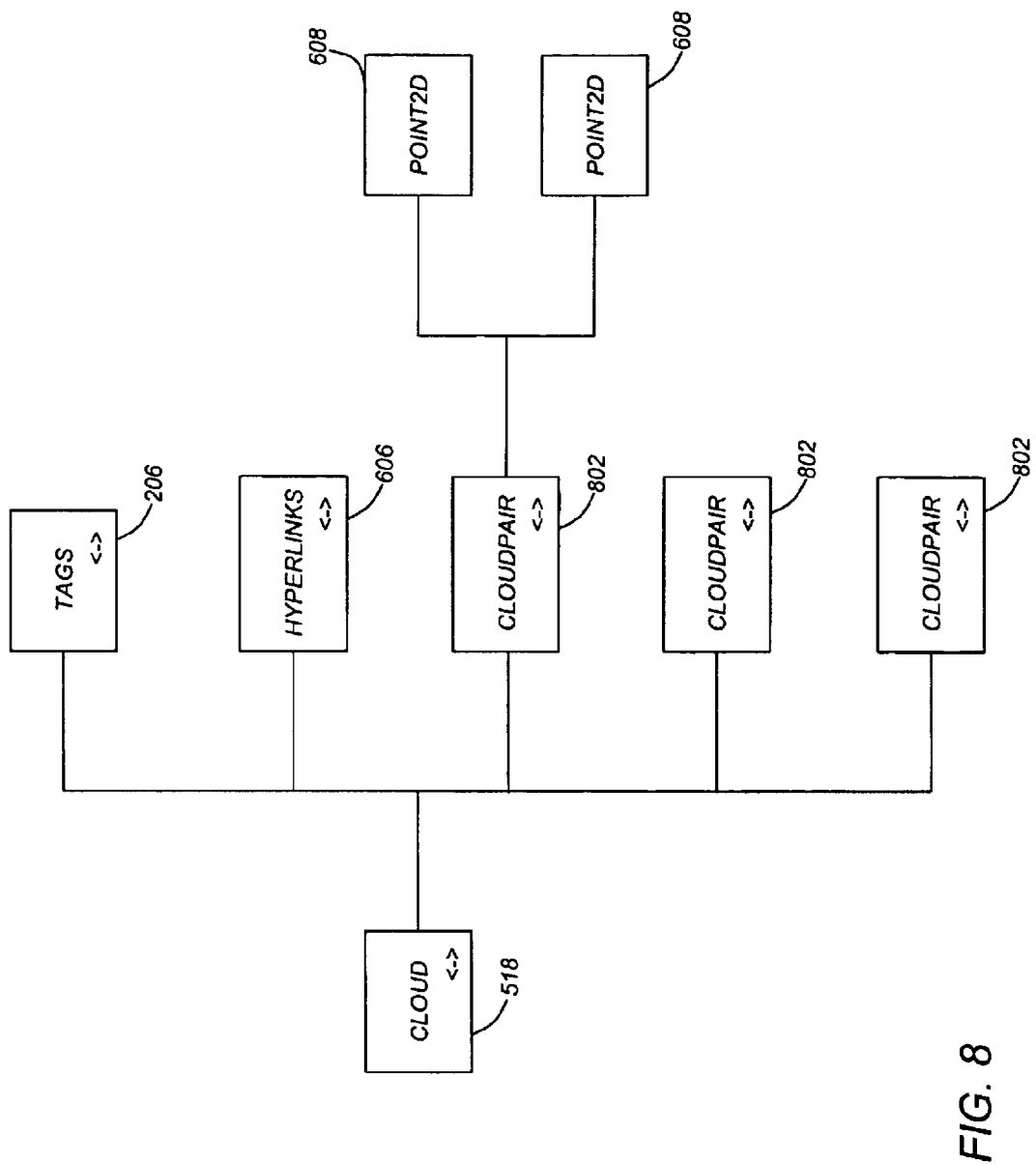
FIG. 8 illustrates the Cloud and CloudPair elements provided in accordance with one or mote embodiments of the invention.

FIG. 8 illustrates the Cloud element 518. The Cloud element 518 comprises the Tags element 206 (with one or more Tag elements 210 each containing a status element 212), a Hyperlinks element 606 (with one or more Hyperlink elements 614), and one or more CloudPair elements 802 wherein each CloudPair element 802 contains two or more Point2d elements 608 (that represent the endpoints of an arc of the cloud).

FIGS. 6, 7, and 8 illustrate the Box 502, Group 516, and Cloud 518 elements respectively. Although not illustrated, a complete schema definition may contain the additional RedlineXML elements shown in FIG. 5: Box 502, Circle 504, Ellipse 506, Arc 508, Polyline 510, Spline 512, Text 514, Group 516, Cloud 518, Note 520, Callout 522, and Style 404.

Table 1 below illustrates elements of the schema. As provided, elements may have one or more attributes. A "?" in Table 1 indicates that the element (or group of elements) may appear zero or one times. The element is optional, but is only allowed to appear once (i.e., the element is optional but not repeatable). The "+" in Table 1 indicates that the element (or group of elements) must appear one or more times. The element is required to appear at least once, but multiple consecutive occurrences may be present (i.e., the element is repeatable but not optional). The "*" in Table 1 indicates that the element (or group of elements) may appear zero or more times. The element can appear as many times consecutively as needed, or even zero times (i.e., the element is repeatable and optional).

The elements and attributes of Table 1 may be further illustrated, defined, and constrained as part of a schema. One or more embodiments of the invention utilize the schema definition set forth in Table 2. Based on the schema definition of Table 2, illustrations for the remaining objects 502–522 and 404 can be produced similar to FIGS. 6, 7, and 8 for the Box 502, Group 516, and Cloud 518 elements respectively. As provided in Tables 1 and 2, each element may be defined to contain other elements and attributes. The attributes may further be constrained to a specific data type (e.g., integer, float, string, etc.) or value (e.g., a specific enumerated value such as those listed for the Status element's 212 state attribute).

The schemas of Table 2, Table 4, and Table 5 can be used to validate a document. For example, the RedlineXML document in Table 3 has been validated in accordance with the schemas defined in Tables 2, 4, and 5.

The first lines of the RedlineXML document in Table 3 indicates the XML version utilized and the name of the schema(s) that may be utilized to validate the document (e.g., RedlineXML_v_005.xml and AcadDWG_v_001.xml). Thereafter, each XML element uses namespace identifiers to specify whether it is part of the RedlineXML schema (i.e., "<redline:") or the AcadDWG schema (i.e., "<acad:"). In addition to specifying the underlying schema, each XML element specifies an element of the schema). For example, the first XML element listed is "<redline:RedlineMarkup>". This XML element specifies that the RedlineXML schema is to be used and the first element is a RedlineMarkup element 200. The next line provides for utilizing a MarkupPlanes element 204 from the RedlineXML schema. Thereafter, any number of specific object instances based on RedlineXML schema elements 502–522 and 404 are specified within the Objects element 208. RedlineXML is defined as an "open" schema. This allows foreign elements to be inserted within any RedlineXML element, provided that the foreign elements are inserted after the elements defined in the RedlineXML schema. For example, if an application such as AutoCAD LT wanted to store a binary chunk of data within a <redline:Box> element, AutoCAD LT would need to define a schema for the binary chunk element, add an attribute to the <RedlineXML> element, and place the binary chunk element within the <redline:Box> element, but after the <redline:Box> element's subelements. Such an example is demonstrated in the sample RedlineXML document listed in Table 3.

Figure 9:
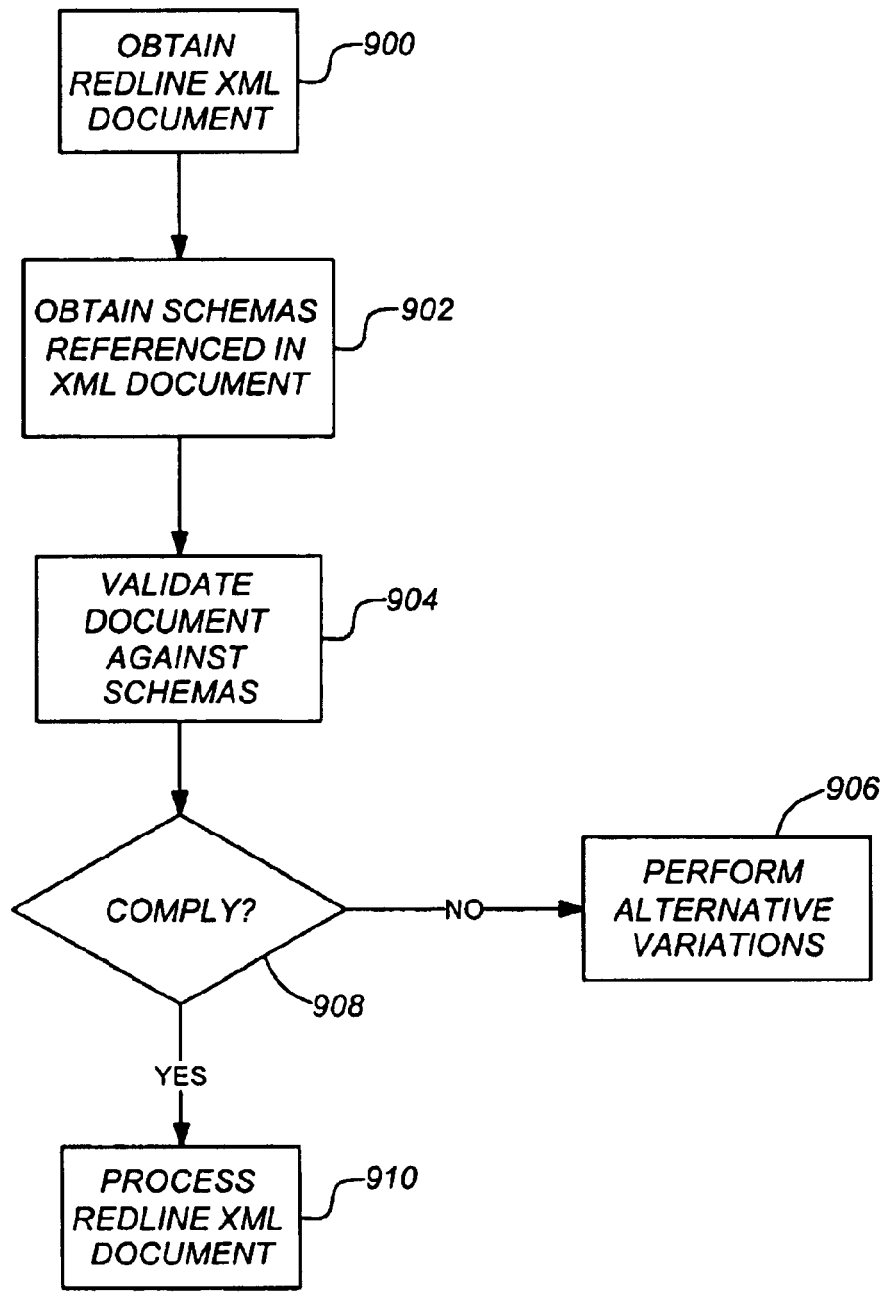
FIG. 9 is a flow chart illustrating the processing of an XML document in accordance with one or more embodiments of the invention.
Figure 10:
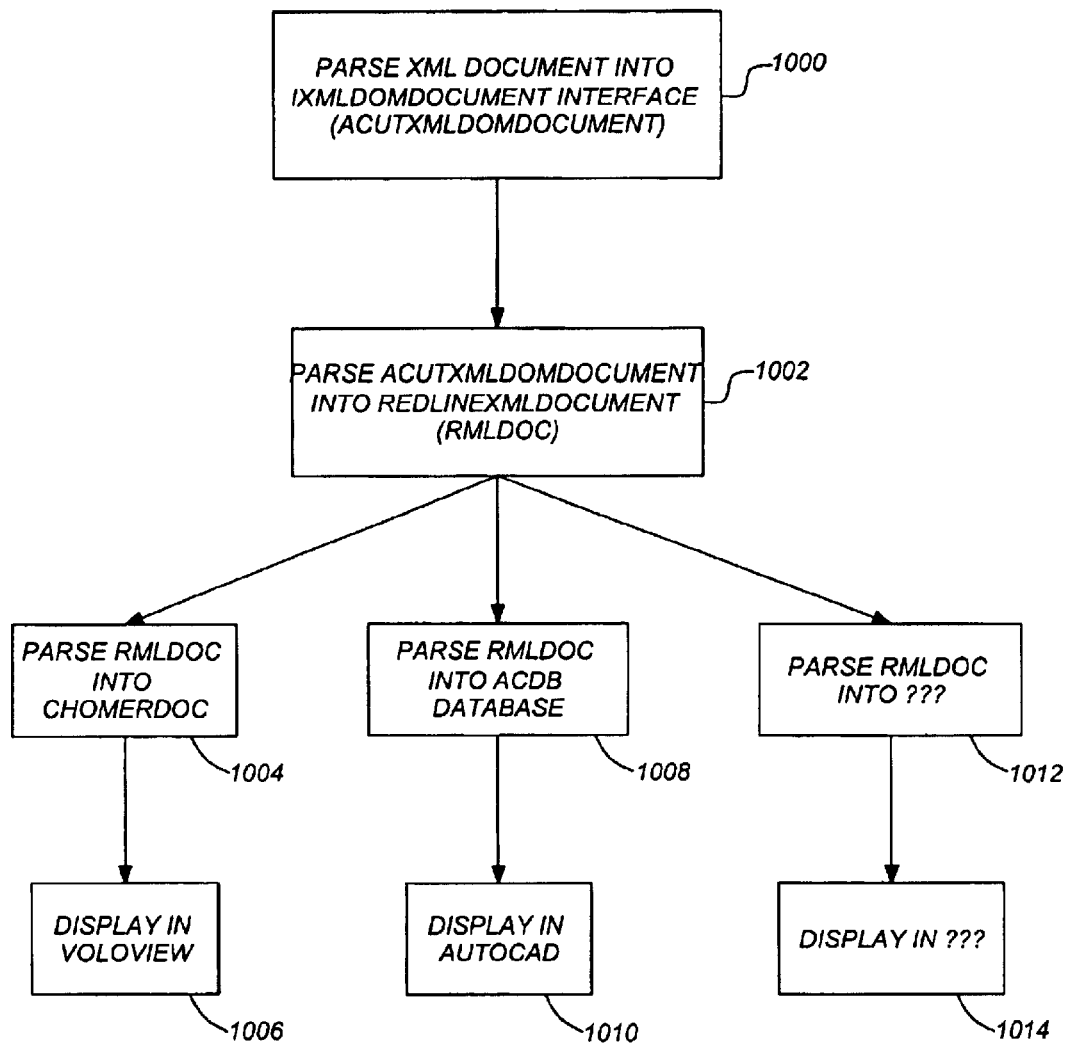
FIG. 10 is a flow chart illustrating the processing and displaying of a RedlineXML document in accordance with one or more embodiments of the invention.
Figure 11:
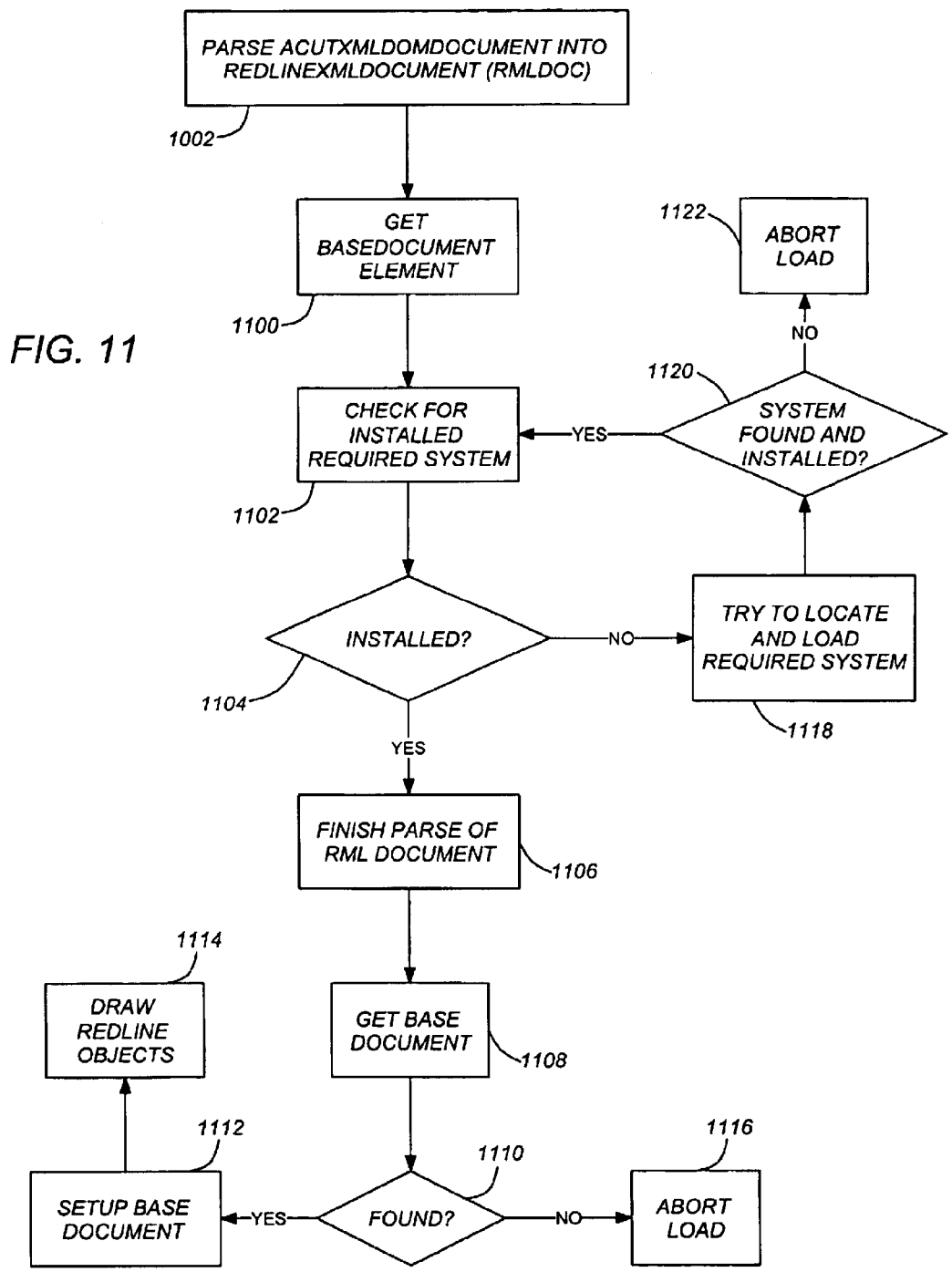
FIG. 11 is a flow chart illustrating details of the processing and displaying of a RedlineXML document in accordance with one or more embodiments of the invention.

FIG. 9 is a flow chart illustrating the processing of an XML document. FIG. 10 is a flow chart illustrating the further processing of an XML document into a RedlineXML document and further into a particular application's data and display space. FIG. 11 is a flow chart illustrating the processing of a specified BaseDocument, and the logic used to obtain the system required to parse and display the base document, in accordance with one or more embodiments of the invention.

Referring to FIG. 9, at step 900, the RedlineXML document 112 is obtained. The RedlineXML document may be transmitted by a server 106 to client 104. Such a transmission may be initiated by a user operating a browser on client computer 104 and either the user or the browser requesting a web page that contains or constitutes the XML document 112. Alternatively, the RedlineXML document 112 may be stored locally in database 116. At step 902, schemas 114 referenced in the RedlineXML document 112 are obtained. For example, in the XML document of Table 3, the RedlineXML_v_005p.xml schema, the AcadDWG_v_001p.xml schema, and the AcadLT_v_001p.xml schema are obtained. The schema references in the XML document 112 may provide a URL for the location of the schema.

Once a RedlineXML document is obtained in step 900 and the schemas 114 are obtained at step 902, a determination is made as to whether the RedlineXML document complies with the constraints of the RedlineXML schema. Such a determination comprises validating the XML document 112 against the obtained XML schemas 114 at step 904 and determining if the documents have been validated (comply) at step 908. If the document does not comply, various alternative variations may be performed at step 906. For example, a browser may attempt to process the valid (complying) portions of the document. Alternatively, the entire document may be rejected. Additionally, the owner of the document (e.g., a web server 110) may be notified of the invalidity of the document.

If the RedlineXML document 112 does comply at step 908, the document is processed at step 910. Steps 900–910 may be performed by a web browser. Alternatively, any application or program capable of processing XML may be utilized (e.g., a XML processor).

FIG. 10 provides further details of process step 901 of FIG. 9. At step 1000 the XML document 112 is parsed into a DOM (Document Object Model) based document. For example, the XML document 112 may be parsed into an IXMLDOMDocument Interface (referred to as an AcUtXMLDOMDocument) by a parser. In one or more embodiments of the invention a DOM parser is utilized. A DOM-based C++ parser produces a DOM representation of an XML document instead of informing an application when elements, attributes, etc. are encountered. Thus, the DOM parser parses the XML document, produces a DOM based document, and passes the DOM based document to additional applications for further processing. Accordingly, the AcUtXMLDOMDocument is passed onto an appropriate program to conduct further processing. For example, if the XML document 112 is a RedlineXML document, the DOM parser may produce a DOM based RedlineXML document which is then further processed by another application that can interpret the DOM based document such as a RedlineXML processor (referred to as an RML processor) or an application containing the RML processor. For example, VoloView™, VoloView Express™, and AutoCAD® may all include DOM processing capabilities in addition to other functionality.

At step 1002, the DOM based document (such as the AcUtXMLDOMDocument) is parsed into a RedlineXMLDocument (referred to as an RMLDoc). The RMLDoc may then be further processed for viewing. For example, at step 1004, the RMLDoc is parsed into a CHomerDoc and displayed using VoloView™ at step 1006. Alternatively, the RMLDoc is parsed into an AcDbDatabase at step 1008 and displayed using AutoCAD® at step 1010. In accordance with embodiments of the invention, the RMLDoc may be parsed into any another format at step 1012 and displayed using any viewer or application capable of displaying redline objects at step 1014.

FIG. 11 is a flow chart further illustrating details of the process and display steps 1004–1014 of FIG. 10. Thus, FIG. 11 illustrates the processing of a specified BaseDocument, and the logic used to obtain the system required to parse and display the base document, in accordance with one or more embodiments of the invention. At step 1002, the DOM based document (e.g., the AcUtXMLDOMDocument) is parsed into an RMLDoc (similar to FIG. 10). Redline objects specified in the RMLDoc are used to mark up a BaseDocument. At step 1100, the BaseDocument referred to in the RMLDoc is obtained. At steps 1102 and 1104, embodiments of the invention check to determine if the system required to process and display the RMLDoc is installed. If the system is not installed, embodiments attempt to locate and download the required system at step 1118. At step 1120, embodiments determine if the system was found and installed at step 1118. If the system was not found, the load of the RMLDoc is aborted at step 1122 (i.e., the system required to display the redline objects was not installed). If the system was found and installed, the process continues at step 1102.

Once the required system is installed, the rest of the RMLDoc is parsed at step 1106. The BaseDocument is retrieved at step 1108. At step 1110, a determination is made as to whether the BaseDocument retrieval was successful. If not, the process is complete, and the attempt to load the RMLDoc is aborted at step 1116. If the BaseDocument was retrieved, the BaseDocument is set up according to the settings in the foreign elements referred to by the BaseDocument element 202 (e.g., the constraints, attributes, etc.) at step 1112. For example, if VoloView™ is being utilized, the BaseDocument is opened up in VoloView™ and settings may be adjusted to accommodate redline objects. At step 1114, the redline objects are displayed/drawn over the BaseDocument. Thereafter, the application being utilized may receive user input for any additional action desired.

Thus, in accordance with one or more embodiments of the invention, an application is configured to interpret and process RedlineXML information and redline objects such that the redline objects can be displayed on a base document.

CONCLUSION

This concludes the description of one or more embodiments of the invention. The following describes some alternative embodiments for accomplishing the present invention.

For example, any type of computer, such as a mainframe, minicomputer, work station or personal computer, could be used with the present invention. In addition, any program, function, or operating system that utilizes redline documents or XML could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| Element Type | Content Type | Content Model | Attributes |
|---|---|---|---|
| RedlineMarkup | Element | BaseDocument?, MarkupPlanes?, Tags?, Objects? | |
| BaseDocument | Text | string | requiredSystem, nameSpace, topNode |
| MarkupPlanes | Element | MarkupPlane* | |
| MarkupPlane | Element | Style?, Tags? | drawPriority, visibilityScaleMin, visibilityScaleMax, name |
| Objects | Element | Box*, Circle*, Spline*, Polyline*, Arc*, Ellipse*, Text*, Cloud*, Note*, Callout*, Group*, Style* | |
| Box | Element | Tags?, Hyperlinks?, Point2d, Point2d | markupPlaneName, cornerRadius, rotation, scale |
| Circle | Element | Tags?, Hyperlinks?, Point2d | markupPlaneName, radius, rotation, scale |
| Text | Element | Tags?, Hyperlinks?, Point2d | markupPlaneName, textContent, rotation, scale, width, height |
| Arc | Element | Tags?, Hyperlinks?, Point2d | markupPlaneName, startAngle, endAngle, radiusMajor, radiusMinor, rotation, scale, angleFuzz |
| Ellipse | Element | Tags?, Hyperlinks?, Point2d | markupPlaneName, radiusMajor, radiusMinor, rotation, scale |
| Polyline | Element | Tags?, Hyperlinks?, Point2d, Point2d+ | markupPlaneName, rotation, scale |
| Spline | Element | Tags?, Hyperlinks?, SplinePoint, SplinePoint+ | markupPlaneName, rotation, scale |
| SplinePoint | Empty | | x, y, tangent |
| Cloud | Element | Tags?, Hyperlinks?, CloudPair, CloudPair, CloudPair* | markupPlaneName, rotation, scale |
| CloudPair | Element | Point2d, Point2d | |
| Group | Element | Tags?, Hyperlinks?, Point2d, Objects? | markupPlaneName, groupType, rotation, scale |
| Note | Element | Tags?, Hyperlinks?, Point2d, Text? | markupPlaneName, width, rotation, scale |
| Callout | Element | Tags?, Hyperlinks?, Point2d, Point2d, Point2d, Text? | markupPlaneName, rotation, scale |
| Style | Empty | | styles, pop |
| Point2d | Empty | | x, y |
| Tags | Element | Tag* | |
| Tag | Element | Status? | reviewer, dateTime, comment |
| Status | Text | string | state |
| Hyperlinks | Element | Hyperlink* | |
| Hyperlink | Empty | | URL |
| acad:Drawing | Element | acad:PlaneDefinition?, acad:VersionInfo?, acad:LayerVisibilityList? | drawingName, viewName, layoutName |
| acad:PlaneDefinition | Element | acad:Vector, acad:Vector?, acad:Point3d | hither, yon, fovy, aspect |

TABLE 1-continued

| Element Type | Content Type | Content Model | Attributes |
|---|---|---|---|
| acad:Point3d | Empty | | x, y, z |
| acad:Vector | Empty | | x, y, z |
| acad:VersionInfo | Text | string | version |
| acad:LayerVisibilityList | Element | Layer* | |
| acad:Layer | Empty | | colorindex, lineWeight, lineStyle, lineStyleScale, visibility, name |

TABLE 2

```
<?xml version ="1.0"?>
<?xml-stylesheet type="text/xsl"
     href="xdr-schema.xsl"?>
<!--(C) Copyright 2000 by Autodesk, Inc. All Rights Reserved.-->
<Schema name = "RedlineXML_v_005p.xml"
    xmlns = "urn:schemas-microsoft-com:xml-data"
    xmlns:dt = "urn:schemas-microsoft-com:datatypes">
    <!-- RedlineMarkup is the root element. Application elements defined    ->
    <!-- to encapsulate the host application's initial settings must be    -->
    <!-- listed after this element.                                         -->
    <ElementType name = "RedlineMarkup" content = "eltOnly" order = "seq">
         <element type = "BaseDocument" minOccurs = "0" maxOccurs = "1"/>
         <element type = "MarkupPlanes" minOccurs = "0" maxOccurs = "1"/>
         <element type = "Tag" minOccurs = "0" maxOccurs = "1"/>
         <element type = "Objects" minOccurs = "0" maxOccurs = "1"/>
    </ElementType>
    <!-- BaseDocument is a specification for the document that is being marked
         up.  -->
    <!-- It specifies the "system" to be used to parse the document being
         marked up,  -->
    <!-- a namespace identifier to use when referencing the elements of that
         -->
    <!-- system's schema, and the name of the schema's top node to use when-->
    <!-- parsing a RedlineXML document for the base document specification.-->
    <!--                                                                   -->
    <!-- All attributes for elements defined in this schema will use the units
         -->
    <!-- used in the base document.  -->
    <ElementType name = "BaseDocument" content = "textOnly" dt:type = "string">
         <AttributeType name = "requiredSystem" dt:type = "string" required =
             "yes"/>
         <AttributeType name = "nameSpace" dt:type = "string" required =
             "yes"/>
         <AttributeType name = "topNode" dt:type = "string" required = "yes"/>
         <attribute type = "requiredSystem"/>
         <attribute type = "nameSpace"/>
         <attribute type = "topNode"/>
    </ElementType>
    <!-- MarkupPlanes is a collection of MarkupPlane elements.   -->
    <ElementType name = "MarkupPlanes" content = "eltOnly" order = "seq">
         <element type = "MarkupPlane" minOccurs = "0" maxOccurs = "*"/>
    </ElementType>
    <!-- A MarkupPlane is a container for visual qualities applied     -->
    <!-- to all RedlineXML objects that exist on that MarkupPlane.     -->
    <!-- RedlineXML objects that do not have a specific Style elements, -->
    <!-- will inherit a Style specification on the host MarkupPlane.   -->
    <ElementType name = "MarkupPlane" content = "eltOnly">
         <AttributeType name = "drawPriority" dt:type = "float"/>
         <AttributeType name = "visibilityScaleMin" dt:type = "float"/>
         <AttributeType name = "visibilityScaleMax" dt:type = "float"/>
         <AttributeType name = "name" dt:type = "string" required = "yes"/>
         <!-- drawPriority is is used to specify a Z draw order.  -->
         <!-- The MarkupPlane with the largest positive value gets drawn
              first,  -->
         <!-- and the one with the largest (absolute) negative value gets -->
         <!-- drawn last.     -->
         <attribute type = "drawPriority"/>
         <!-- The visibilityScale range determines whether a MarkupPlane is
              visible   -->
         <!-- based on the apparent distance (zoom factor) of the viewer from
              the geometry. -->
         <attribute type = "visibilityScaleMin"/>   <!--minimum value for which
              the MarkupPlane is visible-->
         <attribute type = "visibilityScaleMax"/>   <!--maximum value for which
```

TABLE 2-continued

```
        the MarkupPlane is visible-->
    <attribute type = "name"/>
    <element type = "Style" minOccurs = "0" maxOccurs = "1"/>
    <element type = "Tags" minOccurs = "0" maxOccurs = "1"/>
</ElementType>
<!-- Objects is a collection of RedlineXML objects.                -->
<!-- RedlineXML objects themselves do *not* contain a Style element, -->
<!-- but Style elements may appear in the Objects collection.      -->
<!-- Objects defined after a Style element will inherit that       -->
<!-- Style element's style settings.                               -->
<!-- A Style element with the pop attribute set to 'true' will     -->
<!-- restore a previously specified Style (it's a Style Stack).    -->
<!-- If no Style elements have been defined, objects will inherit  -->
<!-- the Style specification for its specified MarkupPlane.        -->
<!-- If no MarkupPlane is specified for the object, it gets        -->
<!-- the default styles defined by the host application.           -->
<ElementType name = "Objects" content = "eltOnly" order = "many">
    <element type = "Box"/>
    <element type = "Circle"/>
    <element type = "Ellipse"/>
    <element type = "Arc"/>
    <element type = "Polyline"/>
    <element type = "Spline"/>
    <element type = "Text"/>
    <element type = "Group"/>
    <element type = "Cloud"/>
    <element type = "Note"/>
    <element type = "Callout"/>
    <element type = "Style"/>
</ElementType>
<!-- The RedlineXML objects defined below have scale and rotation  -->
<!-- attributes. The following rules define the reference point    -->
<!-- for each object when it is being scaled or rotated.           -->
<!--                                                               -->
<!-- if the element has an insertion or anchor point (Text, Group, Note,
Callout) -->
    <!--    use insertion or anchor point,   -->
    <!--                                     -->
<!-- if the element has a center point (Circle, Ellipse, Arc)      -->
    <!--    use center point,                -->
    <!--                                     -->
<!-- if the element is linear      (Polyline, Spline)              -->
    <!--    use the first point (index 0),   -->
    <!--                                     -->
<!-- else                  (Cloud, Box)                            -->
    <!--    use the centroid of the element's points.  -->
    <!--                                     -->
<ElementType name = "Box" content = "eltOnly" order = "seq">
    <AttributeType name = "cornerRadius" dt:type = "float" default =
        "0.0"/>
    <AttributeType name = "rotation" dt:type = "float" default = "0.0"/>
    <AttributeType name = "scale" dt:type = "float" default = "1.0"/>
    <AttributeType name = "markupPlaneName" dt:type = "string"/>
    <attribute type = "cornerRadius"/>
    <attribute type = "rotation"/>
    <attribute type = "scale"/>
    <attribute type = "markupPlaneName"/>
    <element type = "Tags" minOccurs = "0" maxOccurs = "1"/>
    <element type = "Hyperlinks" minOccurs = "0" maxOccurs = "1"/>
    <element type = "Point2d" minOccurs = "1" maxOccurs = "1"/>
    <element type = "Point2d" minOccurs = "1" maxOccurs = "1"/>
</ElementType>
<ElementType name = "Circle" content = "eltOnly" order = "seq">
    <AttributeType name = "radius" dt:type = "float" required = "yes"/>
    <AttributeType name = "rotation" dt:type = "float" default = "0.0"/>
    <AttributeType name = "scale" dt:type = "float" default = "1.0"/>
    <AttributeType name = "markupPlaneName" dt:type = "string"/>
    <attribute type = "radius"/>
    <attribute type = "rotation"/>
    <attribute type = "scale"/>
    <attribute type = "markupPlaneName"/>
    <element type = "Tags" minOccurs = "0" maxOccurs = "1"/>
    <element type = "Hyperlinks" minOccurs = "0" maxOccurs = "1"/>
    <element type = "Point2d" minOccurs = "1" maxOccurs = "1"/>
</ElementType>
<ElementType name = "Ellipse" content = "eltOnly" order = "seq">
    <AttributeType name = "radiusMajor" dt:type = "float" required =
        "yes"/>
    <AttributeType name = "radiusMinor" dt:type = "float" required =
```

TABLE 2-continued

```
            "yes"/>
        <AttributeType name = "rotation" dt:type = "float" default = "0.0"/>
        <AttributeType name = "scale" dt:type = "float" default = "1.0"/>
        <AttributeType name = "markupPlaneName" dt:type = "string"/>
        <attribute type = "radiusMajor"/>
        <attribute type = "radiusMinor"/>
        <attribute type = "rotation"/>
        <attribute type = "scale"/>
        <attribute type = "markupPlaneName"/>
        <element type = "Tags" minOccurs = "0" maxOccurs = "1"/>
        <element type = "Hyperlinks" minOccurs = "0" maxOccurs = "1"/>
        <element type = "Point2d" minOccurs = "1" maxOccurs = "1"/>
    </ElementType>
    <!-- If the Arc element's (startAngle == endAngle) within angleFuzz,   -->
    <!-- then it is a circle. This allows the default values for the       -->
    <!-- startAngle and endAngle attributes to remain unitless.            -->
    <ElementType name = "Arc" content = "eltOnly" order = "seq">
        <AttributeType name = "startAngle" dt:type = "float" default =
            "0.0"/>
        <AttributeType name = "endAngle" dt:type = "float" default = "0.0"/>
        <AttributeType name = "angleFuzz" dt:type = "float" default = "1e-6"/>
        <AttributeType name = "radiusMajor" dt:type = "float" required =
            "yes"/>
        <AttributeType name = "radiusMinor" dt:type = "float"/>
        <AttributeType name = "rotation" dt:type = "float" default = "0.0"/>
        <AttributeType name = "scale" dt:type = "float" default = "1.0"/>
        <AttributeType name = "markupPlaneName" dt:type = "string"/>
        <attribute type = "startAngle"/>
        <attribute type = "endAngle"/>
        <attribute type = "angleFuzz"/>
        <attribute type = "radiusMajor"/>
        <attribute type = "radiusMinor"/>
        <attribute type = "rotation"/>
        <attribute type = "scale"/>
        <attribute type = "markupPlaneName"/>
        <element type = "Tags" minOccurs = "0" maxOccurs = "1"/>
        <element type = "Hyperlinks" minOccurs = "0" maxOccurs = "1"/>
        <element type = "Point2d" minOccurs = "1" maxOccurs = "1"/>
    </ElementType>
    <ElementType name = "Polyline" content = "eltOnly" order = "seq">
        <AttributeType name = "rotation" dt:type = "float" default = "0.0"/>
        <AttributeType name = "scale" dt:type = "float" default = "1.0"/>
        <AttributeType name = "markupPlaneName" dt:type = "string"/>
        <attribute type = "rotation"/>
        <attribute type = "scale"/>
        <attribute type = "markupPlaneName"/>
        <element type = "Tags" minOccurs = "0" maxOccurs = "1"/>
        <element type = "Hyperlinks" minOccurs = "0" maxOccurs = "1"/>
        <element type = "Point2d" minOccurs = "1" maxOccurs = "1"/> <!--
            the first point-->
        <element type = "Point2d" minOccurs = "1" maxOccurs = "*"/>
            <!--the rest of the points-->
    </ElementType>
    <ElementType name = "Spline" content = "eltOnly" order = "seq">
        <AttributeType name = "rotation" dt:type = "float" default = "0.0"/>
        <AttributeType name = "scale" dt:type = "float" default = "1.0"/>
        <AttributeType name = "markupPlaneName" dt:type = "string"/>
        <attribute type = "rotation"/>
        <attribute type = "scale"/>
        <attribute type = "markupPlaneName"/>
        <element type = "Tags" minOccurs = "0" maxOccurs = "1"/>
        <element type = "Hyperlinks" minOccurs = "0" maxOccurs = "1"/>
        <element type = "SplinePoint" minOccurs = "1" maxOccurs = "1"/>
            <!--the first point-->
        <element type = "SplinePoint" minOccurs = "1" maxOccurs = "*"/>
            <!--the rest of the points-->
    </ElementType>
    <ElementType name = "SplinePoint" content = "empty">
        <AttributeType name = "x" dt:type = "float" required = "yes"/>
        <AttributeType name = "y" dt:type = "float" required = "yes"/>
        <AttributeType name = "tangent" dt:type = "float" required = "yes"/>
        <attribute type = "x"/>
        <attribute type = "y"/>
        <attribute type = "tangent"/>
    </ElementType>
    <!-- The Text element's insertion point corresponds to the upper left  -->
    <!-- corner of the Text element's bounding box.                        -->
    <ElementType name = "Text" content = "eltOnly" order = "seq">
        <AttributeType name = "textContent" dt:type = "string"/>
```

TABLE 2-continued

```
    <AttributeType name = "rotation" dt:type = "float" default = "0.0"/>
    <AttributeType name = "scale" dt:type = "float" default = "1.0"/>
    <AttributeType name = "width" dt:type = "float" required = "yes"/>
    <AttributeType name = "height" dt:type = "float" required = "yes"/>
    <AttributeType name = "markupPlaneName" dt:type = "string"/>
    <attribute type = "textContent"/>
    <attribute type = "rotation"/>
    <attribute type = "scale"/>
    <attribute type = "width"/> <!--of the text's bounding box-->
    <attribute type = "height"/> <!--of the text's bounding box-->
    <attribute type = "markupPlaneName"/>
    <element type = "Tags" minOccurs = "0" maxOccurs = "1"/>
    <element type = "Hyperlinks" minOccurs = "0" maxOccurs = "1"/>
    <element type = "Point2d" minOccurs = "1" maxOccurs = "1"/>
        <!--insertion point-->
</ElementType>
<!-- A Group is a collection of other RedlineXML elements.   -->
<ElementType name = "Group" content = "eltOnly" order = "seq">
    <AttributeType name = "rotation" dt:type = "float" default = "0.0"/>
    <AttributeType name = "scale" dt:type = "float" default = "1.0"/>
    <AttributeType name = "markupPlaneName" dt:type = "string"/>
    <attribute type = "rotation"/>
    <attribute type = "scale"/>
    <attribute type = "markupPlaneName"/>
    <element type = "Tags" minOccurs = "0" maxOccurs = "1"/>
    <element type = "Hyperlinks" minOccurs = "0" maxOccurs = "1"/>
    <element type = "Point2d" minOccurs = "1" maxOccurs = "1"/>
        <!--insertion point-->
    <element type = "Objects"/>
</ElementType>
<!-- A Cloud is defined by at least two 3-point arcs: -->
<!-- The second and susequent arcs (except the last one) only require 2
        points as -->
<!-- their first point is coincident with the previous arc's third point. -
        ->
<!-- The last arc only requires one point as its last point is coincident
        with -->
<!-- the first arc's first point. -->
<!-- Clouds are always closed and must consist of at least 2 arcs (four
        points). -->
<!--                                                        -->
<ElementType name = "Cloud" content = "eltOnly" order = "seq">
    <AttributeType name = "rotation" dt:type = "float" default = "0.0"/>
    <AttributeType name = "scale" dt:type = "float" default = "1.0"/>
    <AttributeType name = "markupPlaneName" dt:type = "string"/>
    <attribute type = "rotation"/>
    <attribute type = "scale"/>
    <attribute type = "markupPlaneName"/>
    <element type = "Tags" minOccurs = "0" maxOccurs = "1"/>
    <element type = "Hyperlinks" minOccurs = "0" maxOccurs = "1"/>
<!-- the required first and second points -->
    <element type = "CloudPair" minOccurs = "1" maxOccurs = "1"/>
<!-- the required third and fourth points -->
    <element type = "CloudPair" minOccurs = "1" maxOccurs = "1"/>
<!-- the optional rest of the points -->
    <element type = "CloudPair" minOccurs = "0" maxOccurs = "*"/>
</ElementType>
<!-- A CloudPair is used to enforce an even number of points in a  -->
<!-- Cloud element.                                                -->
<ElementType name = "CloudPair" content = "eltOnly" order = "seq">
    <element type = "Point2d" minOccurs = "1" maxOccurs = "1"/>
    <element type = "Point2d" minOccurs = "1" maxOccurs = "1"/>
</ElementType>
<!-- A Note is defined by a point, some text, and a width:         -->
<!-- The Point2d represents the anchor point,                      -->
<!-- the text is the content of the note,                          -->
<!-- and the width defines the box that encloses the text and thusly -->
<!-- the text wrapping characteristics.                            -->
<!-- A "height" attribute is omitted by design. The idea for a Note -->
<!-- is that its height is minimized by default, preventing the Note -->
<!-- from obscuring the underlying base document. Some UI can be   -->
<!-- implemented to expand and contract the Note. When the Note is -->
<!-- expanded, the height would be calculated based on the specified -->
<!-- width, text, and text styles.                                 -->
<!-- Specifying an insertion point for Note element's Text         -->
<!-- subelement may be ignored. An assumed value of (0,0) will be  -->
<!-- used, placing the upper left corner of the Text element's    -->
<!-- bounding box at the upper left corner of the Note.            -->
<ElementType name = "Note" content = "eltOnly" order = "seq">
```

TABLE 2-continued

```
    <AttributeType name = "rotation" dt:type = "float" default = "0.0"/>
    <AttributeType name = "scale" dt:type = "float" default = "1.0"/>
    <AttributeType name = "width" dt:type = "float" required = "yes"/>
    <AttributeType name = "markupPlaneName" dt:type = "string"/>
    <attribute type = "rotation"/>
    <attribute type = "scale"/>
    <attribute type = "width"/>
    <attribute type = "markupPlaneName"/>
    <element type = "Tags" minOccurs = "0" maxOccurs = "1"/>
    <element type = "Hyperlinks" minOccurs = "0" maxOccurs = "1"/>
    <element type = "Point2d" minOccurs = "1" maxOccurs = "1"/>
        <!--insertion point-->
    <element type = "Text" minOccurs = "0" maxOccurs = "1"/>
</ElementType>
<!-- A Callout is defined by three points and some text:       -->
<!-- The first Point2d represents the anchor point             -->
<!-- (which is the arrow end of a callout's leader).           -->
<!-- The second Point2d represents the "elbow" point           -->
<!-- (which is the "corner" of a callout's leader).            -->
<!-- The third Point2d defines the upper left corner of the    -->
<!-- Callout. The Callout element's Text subelement's insertion -->
<!-- point is ignored and assumed to be (0,0).                 -->
<ElementType name = "Callout" content = "eltOnly" order = "seq">
    <AttributeType name = "rotation" dt:type = "float" default = "0.0"/>
    <AttributeType name = "scale" dt:type = "float" default = "1.0"/>
    <AttributeType name = "markupPlaneName" dt:type = "string"/>
    <attribute type = "rotation"/>
    <attribute type = "scale"/>
    <attribute type = "markupPlaneName"/>
    <element type = "Tags" minOccurs = "0" maxOccurs = "1"/>
    <element type = "Hyperlinks" minOccurs = "0" maxOccurs = "1"/>
    <element type = "Point2d" minOccurs = "1" maxOccurs = "1"/>
        <!--anchor point-->
    <element type = "Point2d" minOccurs = "1" maxOccurs = "1"/>
        <!--elbow point-->
    <element type = "Point2d" minOccurs = "1" maxOccurs = "1"/>
        <!--text point-->
    <element type = "Text" minOccurs = "0" maxOccurs = "1"/>
</ElementType>
<!-- A Style element contains a text string that is a          -->
<!-- semicolon separated list of style_name:style_value pairs. -->
<!-- For example: "fill:purple; stroke:lavender; stroke-width:1cm" -->
<!-- and "font:helvetica; font-size:9; font-color:black".      -->
<!--                                                           -->
<!-- Supported names and values:                               -->
<!--                                                           -->
<!--                                                           -->
<!--                                                           -->
<!--                                                           -->
<!--                                                           -->
<ElementType name = "Style" content = "empty">
    <AttributeType name = "styles" dt:type = "string"/>
    <AttributeType name = "pop" dt:type = "boolean" default = "false"/>
    <attribute type = "styles"/>
    <attribute type = "pop"/>
</ElementType>
<ElementType name = "Point2d" content = "empty">
    <AttributeType name = "x" dt:type = "float" required = "yes"/>
    <AttributeType name = "y" dt:type = "float" required = "yes"/>
    <attribute type = "x"/>
    <attribute type = "y"/>
</ElementType>
<ElementType name = "Tags" content = "eltOnly" order = "seq">
    <element type = "Tag" minOccurs = "0" maxOccurs ="*"/>
</ElementType>
<ElementType name = "Tag" content = "eltOnly" order = "seq">
    <AttributeType name = "reviewer" dt:type = "string"/>
    <AttributeType name = "dateTime" dt:type = "dateTime.tz" required =
        "yes"/>
    <AttributeType name = "comment" dt:type = "string"/>
    <attribute type = "reviewer"/>
    <attribute type = "dateTime"/>
    <attribute type = "comment"/>
    <element type = "Status" minOccurs = "0" maxOccurs = "1"/>
</ElementType>
<ElementType name = "Status" content = "textOnly" dt:type = "string">
    <AttributeType name = "state" dt:type = "enumeration" dt:values =
        "pending approved incorporated rejected other" default =
        "pending"/>
```

TABLE 2-continued

```
        <attribute type = "state"/>
    </ElementType>
    <ElementType name = "Hyperlinks" content = "eltOnly" order = "seq">
        <element type = "Hyperlink" minOccurs = "0" maxOccurs = "*"/>
    </ElementType>
    <ElementType name = "Hyperlink" content = "empty">
        <AttributeType name = "URL" dt:type = "string" required = "yes"/>
        <attribute type = "URL"/>
    </ElementType>
</Schema>
```

TABLE 3

```
<?xml version="1.0" encoding="UTF-8"?>
<RedlineXML xmlns:redline="x- schema:RedlineXML_v_005p.xml"
            xmlns:acad="x-schema:AcadDWG_v_001p.xml"
            xmlns:AcadLT="x-schema:AcadLT_v_001p.xml"
            xml:space="preserve">
    <redline:RedlineMarkup>
        <redline:BaseDocument requiredSystem="AcadDWG_v_001" nameSpace="acad"
            topNode="Drawing">
            "http://www.MrServer.com/AutoCAD/drawings/sinkutil.dwg"
        </redline:BaseDocument>
        <redline:MarkupPlanes>
            <redline:MarkupPlane name="plane1"/>
            <redline:MarkupPlane name="plane2">
                <redline:Style styles="transparency:0.5; fill:purple;
                    stroke:lavender; stroke-width:1cm"/>
            </redline:MarkupPlane>
            <redline:MarkupPlane name="plane3" drawPriority="100"/>
            <redline:MarkupPlane name="plane4" visibilityScaleMin="10"
                visibilityScaleMax="1000"/>
        </redline:MarkupPlanes>
        <redline:Tag dateTime="1988-04-07T18:39:09-08:00">
            <redline:Status state="rejected">
                "This is a test"
            </redline:Status>
        </redline:Tag>
        <redline:Objects>
            <redline:Style styles="transparency:0.5; fill:purple;
                stroke:lavender; stroke-width:1cm"/>
            <redline:Group rotation="30.0" scale="2.5">
                <redline:Point2d x="15.0" y="-10.0"/>
                <redline:Objects>
                    <redline:Polyline>
                        <redline:Point2d x="0.0" y="0.0"/>
                        <redline:Point2d x="1.0" y="1.0"/>
                        <redline:Point2d x="2.0" y="4.0"/>
                        <redline:Point2d x="3.0" y="9.0"/>
                        <redline:Point2d x="4.0" y="16.0"/>
                        <redline:Point2d x="5.0" y="25.0"/>
                    </redline:Polyline>
                    <redline:Group>
                        <redline:Point2d x="4.0" y="-4.0"/>
                        <redline:Objects>
                            <redline:Arc rotation="45.0"
                                radiusMajor="4.56"
                                startAngle="0.0"
                                endAngle="90.0">
                                <redline:Point2d x="13.9"
                                    y="10.8"/>
                            </redline:Arc>
                        </redline:Objects>
                    </redline:Group>
                </redline:Objects>
            </redline:Group>
            <redline:Cloud rotation="132.0">
                <redline:CloudPair>
                    <redline:Point2d x="10.0" y="-6.0"/>
                    <redline:Point2d x="12.0" y="-4.0"/>
                </redline:CloudPair>
                <redline:CloudPair>
                    <redline:Point2d x="14.0" y="-6.0"/>
                    <redline:Point2d x="16.0" y="-8.0"/>
                </redline:CloudPair>
                <redline:CloudPair>
```

TABLE 3-continued

```
            <redline:Point2d x="14.0" y="-10.0"/>
            <redline:Point2d x="12.0" y="-12.0"/>
        </redline:CloudPair>
        <redline:CloudPair>
            <redline:Point2d x="10.0" y="-10.0"/>
            <redline:Point2d x="8.0" y="-8.0"/>
        </redline:CloudPair>
    </redline:Cloud>
    <redline:Spline rotation="250.0">
        <redline:SplinePoint x="2.0" y="0.0" tangent="0.0"/>
        <redline:SplinePoint x="2.0" y="-2.0" tangent="30.0"/>
        <redline:SplinePoint x="2.0" y="-4.0" tangent="60.0"/>
        <redline:SplinePoint x="2.0" y="-6.0" tangent="90.0"/>
        <redline:SplinePoint x="2.0" y="-8.0" tangent="120.0"/>
        <redline:SplinePoint x="2.0" y="-10.0"
            tangent="150.0"/>
        <redline:SplinePoint x="2.0" y="-12.0"
            tangent="180.0"/>
        <redline:SplinePoint x="2.0" y="-14.0"
            tangent="210.0"/>
        <redline:SplinePoint x="2.0" y="-16.0"
            tangent="240.0"/>
        <redline:SplinePoint x="2.0" y="-18.0"
            tangent="270.0"/>
        <redline:SplinePoint x="2.0" y="-20.0"
            tangent="300.0"/>
        <redline:SplinePoint x="2.0" y="-22.0"
            tangent="330.0"/>
        <redline:SplinePoint x="2.0" y="-24.0"
            tangent="360.0"/>
    </redline:Spline>
    <redline:Polyline rotation="-22.0">
        <redline:Point2d x="0.0" y="0.0"/>
        <redline:Point2d x="1.0" y="1.0"/>
        <redline:Point2d x="2.0" y="4.0"/>
        <redline:Point2d x="3.0" y="9.0"/>
        <redline:Point2d x="4.0" y="16.0"/>
        <redline:Point2d x="5.0" y="25.0"/>
    </redline:Polyline>
    <redline:Box cornerRadius="0.5" rotation="45.0">
        <redline:Point2d x="-10.0" y="-9.9"/>
        <redline:Point2d x="0.0" y="0.0"/>
    </redline:Box>
    <redline:Arc rotation="28.0" radiusMajor="8.56"
        startAngle="25.0" endAngle="78.0">
        <redline:Point2d x="13.9" y="10.8"/>
    </redline:Arc>
    <redline:Arc rotation="48.0" radiusMajor="8.56" radiusMinor =
        "4.12" startAngle="10.0" endAngle="110.0">
        <redline:Point2d x="-6.6" y="8.9"/>
    </redline:Arc>
    <redline:Circle radius="4.56">
        <redline:Hyperlinks>
            <redline:Hyperlink
        URL="http://www.circle.net/roundandround.htm"/>
        </redline:Hyperlinks>
        <redline:Point2d x="-10.0" y="-9.9"/>
    </redline:Circle>
    <redline:Style styles="transparency:0.5; fill:red;
        stroke:pink; stroke-width:2cm"/>
    <redline:Text rotation="210.0"
        textContent="http://www.yo.org/somewhere.html"
        width="10.0" height="2.0">
        <redline:Hyperlinks>
            <redline:Hyperlink
                URL="http://www.yo.org/somewhere.html"/>
        </redline:Hyperlinks>
        <redline:Point2d x="10.0" y="-10.0"/>
    </redline:Text>
    <redline:Style pop="true"/>
    <redline:Box rotation="322.0">
        <redline:Point2d x="-5.0" y="-9.0"/>
        <redline:Point2d x="-9.0" y="-1.5"/>
        <AcadLT:binChunk>
            "9qrgpijaf;kbg]-aemb qe ughqkrgn piagp0afejg
            piafewg-9q3rmvbfeboirt8rn4tig"
        </AcadLT:binChunk>
    </redline:Box>
</redline:Objects>
```

TABLE 3-continued

```
            </redline:RedlineMarkup>
    <acad:Drawing
        drawingName="http://www.MrServer.com/AutoCAD/drawings/sinkutil.dwg"
        layoutName="Electrical">
            <acad:PlaneDefinition hither="0.1" yon="100.0" fovy="40"
                aspect="1.333">
                    <acad:Vector x="0.0" y="0.0" z="-1.0"/>
                    <acad:Vector x="0.0" y="0.1" z="0.0"/>
                    <acad:Point3d x="1.0" y="2.0" z="3.0"/>
            </acad:PlaneDefinition>
            <acad:VersionInfo version="10">
                "//$Header: /tahoe/develop/drawings/sinkutil.dwg 10 7/01/99
                    5:56p Eileens $"
            </acad:VersionInfo>
            <acad:LayerVisibilityList>
                <acad:Layer name="0" colorIndex="3" lineWeight=".25pt"
                    lineStyle="dashed" lineStyleScale="1.1"
                    visibility="true"/>
                <acad:Layer name="1" colorIndex="5" lineWeight=".25pt"
                    lineStyle="solid" lineStyleScale="1.2"
                    visibility="true"/>
                <acad:Layer name="2" colorIndex="1" lineWeight=".25pt"
                    lineStyle="phantom" lineStyleScale="1.3"
                    visibility="true"/>
            </acad:LayerVisibilityList>
    </acad:Drawing>
</RedlineXML>
```

TABLE 4

```
<?xml version ="1.0"?>
<Schema name = "AcadDWG_v_001p.xml"
    xmlns = "urn:schemas-microsoft-com:xml-data"
    xmlns:dt = "urn:schemas-microsoft-com:datatypes">
    <ElementType name = "Drawing" content = "eltOnly" order = "seq">
        <AttributeType name = "drawingName" dt:type = "string" required =
            "yes"/>
        <AttributeType name = "viewName" dt:type = "string"/>
        <AttributeType name = "layoutName" dt:type = "string"/>
        <attribute type = "drawingName"/>
        <attribute type = "viewName"/>
        <attribute type = "layoutName"/>
        <element type = "PlaneDefinition" minOccurs = "0" maxOccurs = "1"/>
        <element type = "VersionInfo" minOccurs = "0" maxOccurs = "1"/>
        <element type = "LayerVisibilityList" minOccurs = "0" maxOccurs =
            "1"/>
    </ElementType>
    <ElementType name = "PlaneDefinition" content = "eltOnly" order = "seq">
        <AttributeType name = "hither" dt:type = "float"/>
        <AttributeType name = "yon" dt:type = "float"/>
        <AttributeType name = "fovy" dt:type = "float"/>
        <AttributeType name = "aspect" dt:type = "float"/>
        <attribute type = "hither"/>
        <attribute type = "yon"/>
        <attribute type = "fovy"/>
        <attribute type = "aspect"/>
        <element type = "Vector"/>
        <element type = "Vector" minOccurs = "0" maxOccurs = "1"/>
        <element type = "Point3d"/>
    </ElementType>
    <ElementType name = "LayerVisibilityList" content = "eltOnly" order =
        "seq">
        <element type = "Layer" minOccurs = "0" maxOccurs = "*"/>
    </ElementType>
    <ElementType name = "Layer" content = "empty">
        <AttributeType name = "colorIndex" dt:type = "int"/>
        <AttributeType name = "lineWeight" dt:type = "enumeration" dt:values
            = ".25pt .5pt .75pt 1pt 1.5pt 2.25pt 3pt 4.5pt 6pt"/>
        <AttributeType name = "lineStyle" dt:type = "string"/>
        <AttributeType name = "lineStyleScale" dt:type = "float"/>
        <AttributeType name = "visibility" dt:type = "boolean"/>
        <AttributeType name = "name" dt:type = "string"/>
        <attribute type = "colorIndex"/>
        <attribute type = "lineWeight"/>
        <attribute type = "lineStyle"/>
        <attribute type = "lineStyleScale"/>
```

TABLE 4-continued

```
        <attribute type = "visibility"/>
        <attribute type = "name"/>
    </ElementType>
    <ElementType name = "VersionInfo" content = "textOnly" dt:type = "string">
        <AttributeType name = "version" dt:type = "int"/>
        <attribute type = "version"/>
    </ElementType>
    <ElementType name = "Vector" content = "empty">
        <AttributeType name = "x" dt:type = "float" required = "yes"/>
        <AttributeType name = "y" dt:type = "float" required = "yes"/>
        <AttributeType name = "z" dt:type = "float" required = "yes"/>
        <attribute type = "x"/>
        <attribute type = "y"/>
        <attribute type = "z"/>
    </ElementType>
    <ElementType name = "Point3d" content = "empty">
        <AttributeType name = "x" dt:type = "float" required = "yes"/>
        <AttributeType name = "y" dt:type = "float" required = "yes"/>
        <AttributeType name = "z" dt:type = "float" required = "yes"/>
        <attribute type = "x"/>
        <attribute type = "y"/>
        <attribute type = "z"/>
    </ElementType>
</Schema>
```

TABLE 5

```
<?xml version ="1.0"?>
<Schema name = "AcadLT_v_001p.xml"
    xmlns = "urn:schemas-microsoft-com:xml-data"
    xmlns:dt = "urn:schemas-microsoft-com:datatypes">
    <ElementType name = "binChunk" content = "textOnly" dt:type = "string">
    </ElementType>
</Schema>
```

What is claimed is:

1. A method for displaying redline markups on a base document comprising:
   (a) accessing a RedlineXML (extended markup language) document that conforms to a RedlineXML schema, wherein the RedlineXML schema identifies the structure of the RedlineXML document, wherein the Redline XML document comprises:
      (1) a base document element that identifies a base document; and
      (2) an object element comprising one or more attributes for displaying a redline markup object on the base document; and
   (b) displaying the redline markup object on the base document in accordance with the objects element and the one or more attributes set forth in the RedlineXML document.

2. The method of claim 1 wherein the object element specifies one or more constraints and one or more attributes for drawing a redline geometric object on the base document.

3. The method of claim 1 wherein the object element specifies one or more constraints and one or more attributes for drawing redline text on the base document.

4. The method of claim 1 wherein the object element specifies one or more constraints and one or more attributes for drawing a group of redline objects on the base document.

5. The method of claim 1 wherein:
   the object element is in a markup plane; and
   the Redline XML document identifies the markup plane.

6. The method of claim 1 wherein the base document element further identifies a system that can parse and display the base document.

7. A data structure storing a RedlineXML (extensible markup language) document that conforms to a RedlineXML schema, the data structure being stored in a data storage device for use by a redline processor executed by a computer, wherein:
   (a) the RedlineXML schema identifies the structure of the RedlineXML document;
   (b) the Redline XML document comprises:
      (1) a base document element that identifies a base document;
      (2) an object element comprising one or more attributes for displaying a redline markup object on the base document; and
   (c) the redline processor processes and displays the redline markup object on the base document in accordance with the objects element and the one or more attributes set forth in the RedlineXML document.

8. The data structure of claim 7 wherein the object element specifies one or more constraints and one or more attributes for drawing a redline geometric object on the base document.

9. The data structure of claim 7 wherein the object element specifies one or more constraints and one or more attributes for drawing redline text on the base document.

10. The data structure of claim 7 wherein the object element specifies one or more constraints and one or more attributes for drawing a group of redline objects on the base document.

11. The data structure of claim 7 wherein:
    the object element is in a markup plane; and
    the Redline XML document identifies the markup plane.

12. The data structure of claim 7 wherein the base document element further identifies a system that can parse and display the base document.

13. A computer-implemented system for displaying redline markups on a base document, the system comprising:
    (a) a computer;
    (b) a document to be utilized as a base document;
    (c) a RedlineXML (extensible markup language) schema that identifies the structure of a RedlineXML document, wherein the RedlineXML schema comprises:

(1) a base document element that identifies a base document; and (2) an object element comprising one or more attributes for displaying a redline markup object on the base document;

(d) a RedlineXML document that conforms to the RedlineXML schema;

(e) a redline processor installed on the computer, the redline processor configured to display the redline markup object on the base document in accordance with the object elements and the one or more attributes set forth in the RedlineXML document.

14. The system of claim 13 wherein the object element specifies one or more constraints and one or more attributes for drawing a redline geometric object on the base document.

15. The system of claim 13 wherein the object element specifies one or more constraints and one or more attributes for drawing redline text on the base document.

16. The system of claim 13 wherein the object element specifies one or more constraints and one or more attributes for drawing a group of redline objects on the base document.

17. The system of claim 13 wherein:

the object element is in a markup plane; and the Redline XML document identifies the markup plane.

18. The system of claim 13 wherein the base document element further identifies a program that can parse and display the base document.

\* \* \* \* \*